(12) United States Patent
Nishiyama et al.

(10) Patent No.: US 10,990,084 B2
(45) Date of Patent: Apr. 27, 2021

(54) CONTROL APPARATUS, DATA STRUCTURE, AND INFORMATION PROCESSING METHOD

(71) Applicant: OMRON Corporation, Kyoto (JP)

(72) Inventors: Yoshihide Nishiyama, Yokohama (JP); Shigeyuki Eguchi, Joyo (JP); Masanori Ota, Otsu (JP)

(73) Assignee: OMRON Corporation, Kyoto (JP)

(*) Notice: Subject to any disclaimer, the term of this patent is extended or adjusted under 35 U.S.C. 154(b) by 526 days.

(21) Appl. No.: 15/900,210

(22) Filed: Feb. 20, 2018

(65) Prior Publication Data

US 2019/0171192 A1    Jun. 6, 2019

(30) Foreign Application Priority Data

Mar. 14, 2017  (JP) .............................. JP2017-048274

(51) Int. Cl.
*G05B 19/418* (2006.01)
*G05B 23/02* (2006.01)
(Continued)

(52) U.S. Cl.
CPC ... *G05B 19/41835* (2013.01); *G05B 23/0264* (2013.01); *G06F 1/12* (2013.01);
(Continued)

(58) Field of Classification Search
CPC .......... G05B 19/41835; G05B 23/0264; G05B 2219/31368; G06F 16/22; G06F 16/2379; G06F 1/12; G06F 1/14; G06F 9/52
(Continued)

(56) References Cited

U.S. PATENT DOCUMENTS 6,339,790 B1 * 1/2002 Inoue ...................... H04L 41/00
709/224
9,413,852 B2 * 8/2016 Lawson .................. H04L 41/12
(Continued)

FOREIGN PATENT DOCUMENTS

CN      103261983 A    8/2013
CN      103718122 A    4/2014
(Continued)

OTHER PUBLICATIONS

Extended European search report dated Aug. 20, 2018 in the counterpart European patent application.
(Continued)

*Primary Examiner* — Robert E Fennema
*Assistant Examiner* — Christopher W Carter
(74) *Attorney, Agent, or Firm* — Metrolex IP Law Group, PLLC

(57) ABSTRACT

A control apparatus that controls a control target is provided. The control apparatus includes: a time manager configured to manage time; a counter configured to synchronize with at least one device; a control computation unit configured to execute control computation according to timing indicated by the counter; and a record generator configured to generate a record that includes an observation value that is available to the control computation unit and is related to the control target, time that is indicated by the time manager and is associated with the observation value, and a counter value that is indicated by the counter and is associated with the observation value.

9 Claims, 17 Drawing Sheets

(51) Int. Cl.
    *G06F 16/22*     (2019.01)
    *G06F 16/23*     (2019.01)
    *G06F 1/12*     (2006.01)
    *G06F 1/14*     (2006.01)
    *G06F 9/52*     (2006.01)

(52) U.S. Cl.
    CPC ............... *G06F 1/14* (2013.01); *G06F 9/52* (2013.01); *G06F 16/22* (2019.01); *G06F 16/2379* (2019.01); *G05B 2219/31368* (2013.01)

(58) Field of Classification Search
    USPC .......................................................... 700/117
    See application file for complete search history.

(56) References Cited

U.S. PATENT DOCUMENTS

| | | |
|---|---|---|
| 2002/0183864 A1 | 12/2002 | Apel et al. |
| 2009/0132321 A1 | 5/2009 | Kamisuwa et al. |
| 2013/0254584 A1 | 9/2013 | Tamaoki |
| 2014/0215167 A1 | 7/2014 | Ochiai |
| 2014/0236997 A1 | 8/2014 | Okamura et al. |
| 2016/0091883 A1 | 3/2016 | Fujiwara et al. |

FOREIGN PATENT DOCUMENTS

| | | |
|---|---|---|
| CN | 103995499 A | 8/2014 |
| CN | 105209987 A | 12/2015 |
| EP | 2767906 A1 | 8/2014 |
| GB | 2324892 A | 11/1998 |
| GB | 0212598 | 7/2002 |
| JP | 2004-187040 A | 7/2004 |
| JP | 2009-289131 A | 12/2009 |
| JP | 2010-262491 A | 11/2010 |
| JP | 2010-271850 A | 12/2010 |
| JP | 2013-54497 A | 3/2013 |
| JP | 2015-219616 A | 12/2015 |
| JP | 2017-21417 A | 1/2017 |
| WO | 98/41917 A1 | 9/1998 |
| WO | 2009/068034 A1 | 6/2009 |
| WO | 2012/081115 A1 | 6/2012 |

OTHER PUBLICATIONS

Japanese Office Action (JPOA) dated Apr. 24, 2018 in the counterpart Japanese patent application.
Office Action (CNOA) dated Aug. 31, 2020 in a counterpart Chinese patent application.

* cited by examiner

FIG. 7A

STRUCTURE OF RECORD INFORMATION:

182

| TIME | COUNTER VALUE | INDEX VALUE | • INPUT DATA (INPUT VALUES)<br>• OUTPUT DATA (OUTPUT VALUES)<br>• COMPUTATION DATA (COMPUTATION VALUES)<br>• MANUFACTURING DATA (EXECUTION INSTRUCTION VALUES)<br>• EVENT DATA |
|---|---|---|---|
| 1821 | 1822 | 1823 | 1824 |

FIG. 7B

EXAMPLE OF RECORD INFORMATION:

| 2016.9.20 10:50:34.250.000 | 123456789 | 5678890 | ITEM NUMBER 001 | SENSOR 1=1.234 | VARIABLE X=0.789 | MOTION TARGET VALUE Y=34.5 |
| 2016.9.20 10:50:34.250.500 | 123456890 | 5678891 | ITEM NUMBER 001 | SENSOR 1=1.235 | VARIABLE X=0.800 | MOTION TARGET VALUE Y=35.0 |
| ⋮ | | | | | | |

FIG. 16A

RECORDS IN CHRONOLOGICAL DATABASE 182A

| | | | |
|---|---|---|---|
| TIME t1 | INDEX VALUE I1 | COUNTER VALUE c1 | OBSERVATION VALUE 1 | ... |
| TIME t2 | INDEX VALUE I2 | COUNTER VALUE c2 | OBSERVATION VALUE 2 | ... |
| TIME t3 | INDEX VALUE I3 | COUNTER VALUE c4 | OBSERVATION VALUE 4 | ... |
| TIME t4 | INDEX VALUE I4 | COUNTER VALUE c4 | OBSERVATION VALUE 5 | ... |
| TIME t5 | INDEX VALUE I5 | COUNTER VALUE c5 | OBSERVATION VALUE 6 | ... |

INDEX VALUE I3 IS MISSING
→IT IS DETERMINED THAT WRITING OF CHRONOLOGICAL DATA FROM CONTROL PROGRAM TO CHRONOLOGICAL DATABASE HAS FAILED (ERROR #1)

FIG. 16B

RECORDS IN MEMORY CARD 182A

| | | | |
|---|---|---|---|
| TIME t1 | INDEX VALUE I1 | COUNTER VALUE c1 | OBSERVATION VALUE 1 | ... |
| TIME t2 | INDEX VALUE I2 | COUNTER VALUE c2 | OBSERVATION VALUE 2 | ... |
| TIME t4 | INDEX VALUE I4 | COUNTER VALUE c4 | OBSERVATION VALUE 4 | ... |
| TIME t5 | INDEX VALUE I5 | COUNTER VALUE c5 | OBSERVATION VALUE 5 | ... |
| TIME t5 | INDEX VALUE I6 | COUNTER VALUE c6 | OBSERVATION VALUE 6 | ... |

INDEX VALUE I3 IS MISSING
→IT IS DETERMINED THAT OUTPUT OF DATABASE FILE FROM CHRONOLOGICAL DATABASE TO MEMORY CARD HAS FAILED (ERROR #2)

CONTROL APPARATUS, DATA STRUCTURE, AND INFORMATION PROCESSING METHOD

CROSS-REFERENCES TO RELATED APPLICATIONS

This application claims priority to Japanese Patent Application No. 2017-048274 filed Mar. 14, 2017, the entire contents of which are incorporated herein by reference.

FIELD

The disclosure relates to a control apparatus that has the function of collecting and storing data regarding a control target.

BACKGROUND

FA (Factory Automation) technology that involves a control apparatus such as a PLC (programmable controller) is commonly used in various fields of production. There is demand for ex-post analysis of data handled by such a control apparatus.

Due to development of ICT (Information and Communication Technology), the amount of data that can be collected and stored by control apparatuses is also increasing. In such a situation, JP 2015-219616A discloses technology for reducing the amount of communication data that is transmitted between a controller and a host data processing apparatus, to avoid increasing the capacities of the network and devices, or avoid providing the network and devices with unnecessarily increased functionality. More specifically, JP 2015-219616A discloses a configuration for transmitting, to a data processing apparatus: time counter synchronization information that includes reference time information and a reference time counter that corresponds to the reference time information; and time counter-added plant device status data, which is plant device status data to which a time counter incremented at intervals of an execution unit time has been added.

JP 2015-219616A is an example of background art.

SUMMARY

In converse to the objective disclosed in JP 2015-219616A, there is demand to collect a larger amount of data. To address such a demand, a system for aggregating pieces of data, which have been collected from various devices, in a control apparatus has been developed.

When pieces of data that have been separately collected by a plurality of devices are to be aggregated and analyzed, strict time synchronization is often required. With the technology disclosed in JP 2015-219616A, it is impossible to achieve, for example, time accuracy that is sufficient to carry out analysis.

To fulfill the above-described demand, one or more aspects may provide a mechanism for enabling a control apparatus that is provided with the function of collecting and storing data regarding a control target, to easily perform ex-post analysis or the like.

According to one aspect, a control apparatus that controls a control target is provided. The control apparatus includes: a time manager configured to manage time; a counter configured to synchronize with at least one device; a control computation unit configured to execute control computation according to timing indicated by the counter; and a record generator configured to generate a record that includes an observation value that is available to the control computation unit and is related to the control target, a time that is indicated by the time manager and is associated with the observation value, and a counter value that is indicated by the counter and is associated with the observation value.

According to this aspect, it is possible to collect observation values that are each associated with time and a counter value. Such observation values are collected in advance in chronological order, and thus, when performing ex-post analysis on the observation values, it is possible to perform data analysis with reference to the time, and it is also possible to perform data analysis with reference to counter values, which are more accurate. Therefore, there is no need to perform complex processing for time synchronization, for example, and even hardware with limited resources can realize more accurate data analysis.

It may be preferable that the counter includes a first counter configured to manage execution timing of control computation, and a second counter configured to manage data communication timing on a bus or a network for periodical communication that is performed to establish connection with another control apparatus. The control apparatus further includes a synchronization manager that provides at least one device with an instruction to match a counter value indicated by a counter of the at least one device with a counter value indicated by the second counter.

According to this aspect, it is possible to accurately control the execution timing of control computation according to the counter value acquired from the first counter, and it is also possible to achieve synchronization regarding communication with at least one device according to the execution timing of the control computation. By providing such counters, even hardware that has limited resources for time management can realize more accurate data analysis.

It may be preferable that the record generator adds a first index value that is updated each time a record is generated, to the record.

According to this aspect, it is possible to detect an abnormality that may occur during the process of generating a record by performing ex-post analysis regarding the updating status of the first index value added to the record. Since such processes of updating and adding the first index value are employed, there is no need to constantly monitor an abnormality that may occur in the process of generating a record, and it is possible to reduce hardware resources that are required for the process of generating a record.

It may be preferable that the control apparatus further includes a chronological database configured to store records generated by the record generator, in chronological order.

According to this aspect, it is easier to refer to a record that is stored in the chronological database in the control apparatus. By employing such a configuration, it is possible to reduce hardware resources for storing and referring to a record, compared to cases in which a chronological database is located outside the control apparatus.

It may be preferable that the chronological database stores a record in chronological order after further adding, to the record, a second index value that is updated each time the record is stored.

According to this aspect, it is possible to detect an abnormality that may occur during the process of storing a record by performing ex-post analysis regarding the updating status of the second index value added to the record. Since such processes of updating and adding the second index value are employed, there is no need to constantly monitor an abnormality that may occur in the process of storing a record, and it is possible to reduce hardware resources required for the process of storing a record.

It may be preferable that the observation value includes at least one of: input data that is acquired from the control target; output data that is determined through control computation that is based on the acquired input data and is output to the control target; and computation data that is computed during the control computation.

According to this aspect, any data that is available to the control computation unit can be employed as an observation value, and it is possible to more accurately determine the temporal relationship between such pieces of data.

It may be preferable that the record generator is configured to generate an event that corresponds to a predetermined condition when the predetermined condition is satisfied, and further generate a record in which a counter value indicated by the counter that indicates timing which the event is generated is associated with the content of the generated event.

According to this aspect, it is possible to easily specify an observation value that was collected at or near a point in time when a certain event was generated, and it is easier to identify the cause of the generated event. When a certain event is generated, it is only necessary to store a counter value that corresponds to the details of the generated event. Therefore, fewer hardware resources are required compared to cases in which all events are stored.

It may be preferable that the record includes the time and the counter value associated with the observation value as keys, and the observation value as a value corresponding to the keys.

According to this aspect, even when a large number of records are stored, it is possible to specify a target observation value using the counter value as a search key. Using such a key-value type record, it is possible to reduce hardware resources required for searching for an observation value.

Another aspect provides a data structure of data that is generated by a control apparatus that includes a timer manger configured to manage time and a counter configured to synchronize with another device. The data structures includes: an observation value related to a control target; a time that is indicated by the time manager and is associated with the observation value; and a counter value that is indicated by the counter and is associated with the observation value.

According to this aspect, an observation value with which a time and a counter value are associated can be collected. Such observation values are collected in advance in chronological order, and thus, when performing ex-post analysis on the observation values, it is possible to perform data analysis with reference to the time, and it is also possible to perform data analysis with reference to counter values, which are more accurate. Therefore, there is no need to perform complex processing for time synchronization, for example, and even hardware with limited resources can realize more accurate data analysis.

Yet another aspect provides an information processing method for a control system that includes a control apparatus that controls a control target. The information processing method includes: managing time; executing control computation according to timing that is indicated by a counter configured to synchronize with at least one device; generating a record that includes an observation value related to the control target, a time that is associated with the observation value, and a counter value that is associated with the observation value, and stores the record in chronological order; and aggregating data based on a counter value included in a record stored in chronological order, after adjusting timing with another record stored in chronological order.

According to this aspect, an observation value with which a time and a counter value are associated can be collected. Such observation values are collected in advance in chronological order, and thus, when performing ex-post analysis on the observation values, it is possible to perform data analysis with reference to the time, and it is also possible to perform data analysis with reference to counter values, which are more accurate. Therefore, there is no need to perform complex processing for time synchronization, for example, and even hardware with limited resources can realize more accurate data analysis.

One or more embodiments may enable a control apparatus that is provided with the function of collecting and storing data regarding a control target, to easily perform ex-post analysis or the like.

BRIEF DESCRIPTION OF THE DRAWINGS

FIGS. 7A and 7B are diagrams illustrating an example of a data structure of chronological data that is stored in a chronological database of a control apparatus according to one or more embodiments.

FIGS. 16A and 16B are schematic diagrams illustrating examples of processing that is performed to detect data loss occurring in an example of processing that is performed on chronological data, such as in FIG. 15.

DETAILED DESCRIPTION

Figure 1:
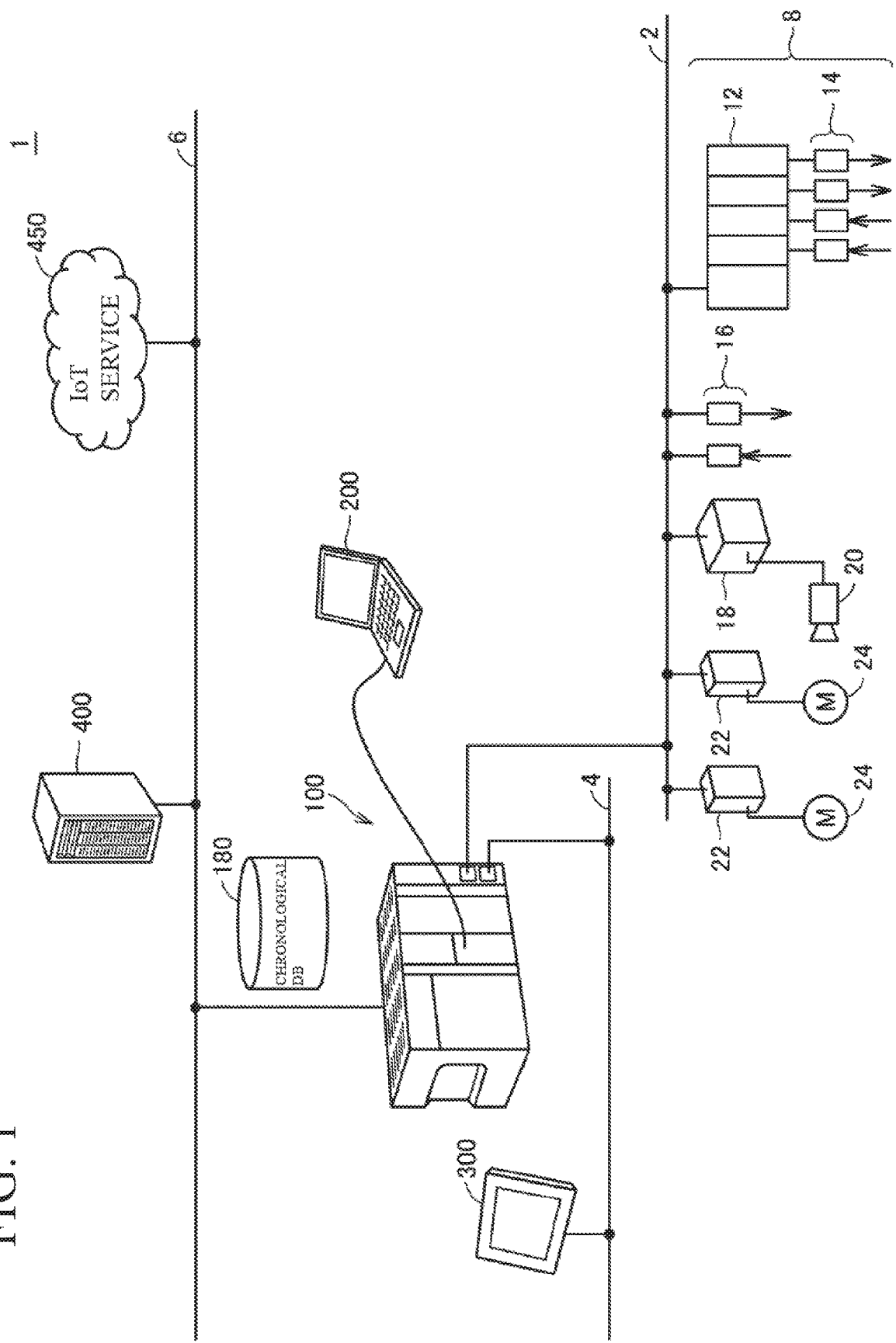
FIG. 1 is a schematic diagram illustrating an example of an overall configuration of a control system according to one or more embodiments.

The following describes one or more embodiments in detail with reference to the drawings. Note that the same or corresponding components in the drawings are assigned the same reference numerals and descriptions thereof are not repeated.

A. Example of Overall Configuration of Control System

First, an example of an overall configuration of a control system 1 that includes a control apparatus according to one or more embodiments will be described.

FIG. 1 is a schematic view showing an example of an overall configuration of the control system 1 according to one or more embodiments. As shown in FIG. 1, the control system 1 according to one or more embodiments includes a control apparatus 100 that controls a control target, as a main constituent element.

The control apparatus 100 may be realized as a kind of computer such as a PLC (programmable controller). The control apparatus 100 is connected to a field apparatus group 8 via a field bus 2, and is also connected to one or more display apparatuses 300 via a field bus 4. The control apparatus 100 transmits and receives data to and from apparatuses that are connected to the control apparatus 100, via buses or networks. Generally, "field bus" is also referred to as "field network". However, a generic term "field bus" is used in the following to simplify descriptions. That is, "field buses" in the present specification may include "field networks" in addition to "field buses".

The control apparatus 100 has a control computation function, which is the function of executing various kinds of computations to control a manufacturing apparatus or facility. In addition to the control computation function, the control apparatus 100 also has an input/output function, which is the function of acquiring data that is measured by the field apparatus group 8 and is transmitted to the control apparatus 100 (hereinafter also referred to as "input data"), and various kinds of data that are computed using the control computation function.

The control apparatus 100 also has a chronological database 180. As described below, the chronological database 180 stores various kinds of data, which have been acquired using the input/output function, in chronological order. In the following description, "database" is also denoted as "DB".

More specifically, the control apparatus 100 has a record generation function, which is the function of generating a record that includes specified data, and the chronological database 180 stores records that are generated using the record generation function, in chronological order.

The data or records stored in the chronological database 180 are also referred to as "chronological data". In the present specification, "chronological data" means a series of values that are obtained by continuously (or discontinuously, at constant intervals) observing temporal changes in data (observation values) regarding a given target.

In the present specification, "observation values" is a generic concept that refers to values (actual values) that can be used in control computations in the control apparatus 100. Observation values typically include values that are acquired from a control target and are input to control computations (e.g. measurement values acquired from a field), output values that are determined based on the acquired input values through a control computation and are output to the control target (e.g. instruction values to be given to a field), computation values that are computed during the process of a control computation (e.g. any variable values), and so on. That is, "observation values" include any values that can be stored in the control apparatus 100 as data, or externally output from the control apparatus 100 as data.

Preferably, buses or networks for periodic communication, which guarantee accurate data arrival time, are employed as the field bus 2 and the field bus 4. EtherCAT (registered trademark), EtherNet/IP (registered trademark), DeviceNet (registered trademark), CompoNet (registered trademark), and so on are known as examples of such buses or networks for periodic communication.

The field apparatus group 8 includes an apparatus that collects input data from a manufacturing apparatus and a production line related to a control target or control (hereinafter also collectively referred to as "field"). An input relay and various sensors (e.g. an analogue sensor, a temperature sensor, and a vibration sensor) can be conceived of as examples of such an apparatus that collects input data. The field apparatus group 8 also includes an apparatus that has a certain effect on a field based on instructions that are generated in the control apparatus 100 (hereinafter also referred to as "output data"). An output relay, a contactor, a servo driver, a servo motor, and any other actuators can be conceived of as examples of such an apparatus that has a certain effect on a field.

The field apparatus group 8 transmits and receives data that includes the input data and the output data to and from the control apparatus 100 via the field bus 2. In the example configuration shown in FIG. 1, the field apparatus group 8 includes a remote I/O (Input/Output) apparatus 12, a relay group 14, an image sensor 18, a camera 20, servo drivers 22, and servo motors 24. The field apparatus group 8 is not limited to these apparatuses, and any device that can collect the input data or perform a certain action that is based on the output data may be employed.

The remote I/O apparatus 12 includes a communication coupler that performs communication via the field bus 2, and an input/output part (hereinafter also referred to as "I/O unit") for acquiring input data and outputting output data. The control apparatus 100 and the field use such an I/O unit to transmit and receive input data and output data to and from each other. FIG. 1 shows an example in which digital signals are transmitted and received via the relay group 14 as input data and output data.

The I/O unit may be directly connected to a field bus. FIG. 1 shows an example in which an I/O unit 16 is directly connected to the field bus 2.

The image sensor 18 performs image measuring processing such as pattern matching on image data captured by the camera 20, and outputs the results of processing to the control apparatus 100.

Each servo driver 22 drives the servo motor 24 thereof according to output data (such as a position instruction and a speed instruction) from the control apparatus 100.

As described above, the control apparatus 100 and the field apparatus group 8 transmit and receive data to and from each other via the field bus 2, and data that is transmitted and received is updated at very short intervals in a range from the order of several hundred microseconds to the order of several ten milliseconds. Processing that is performed to update data that is transmitted and received is also referred to as I/O refresh processing.

Each of the one or more display apparatuses 300 that are connected to the control apparatus 100 via the field bus 4 accepts an operation performed by a user, and outputs a command that corresponds to the user operation to the control apparatus 100, and also graphically displays the results of computations performed in the control apparatus 100.

A support apparatus 200 can be connected to the control apparatus 100. The support apparatus 200 is an apparatus that assists the control apparatus 100 in performing preparations that are necessary for the control apparatus 100 to control a control target. Specifically, the support apparatus 200 provides a development environment in which programs that are to be executed in the control apparatus 100 are developed (e.g. a program creating/editing tool, a parser, and a compiler), a setting environment in which parameters (configuration) of the control apparatus 100 and various kinds of devices that are connected to the control apparatus 100 are set, the function of outputting a user program that has been generated, to the control apparatus 100, the function of performing online correction/modification of a user program or the like that is to be executed on the control apparatus 100, and so on.

The control apparatus 100 also has a gateway function, which is the function of outputting, to external apparatuses, data that has been acquired using the input/output function and/or data that is stored in the chronological database 180.

As typical examples of the external apparatuses, FIG. 1 shows a manufacturing execution system (MES) 400 and an IoT (Internet of Things) service 450 that are connected to the control apparatus 100 via a host network 6. The control apparatus 100 can provide the external system and external service with information that has been received from a control target manufacturing apparatus or facility.

The manufacturing execution system 400 is a system that acquires information from a control target manufacturing apparatus and facility to monitor and manage production overall, and can also handle order information, quality information, shipping information, and so on. A database for storing information may be located in the manufacturing execution system 400 or in parallel with the manufacturing execution system 400. The control apparatus 100 can acquire, from the manufacturing execution system 400, manufacturing data that indicates, for example, a manufacturing state in a control target manufacturing apparatus and facility.

A kind of cloud service that includes one or more computers that are connected to the host network 6 or the Internet that is connected to the host network 6 can be conceived of as an example of the IoT service 450. A system that is included in the IoT service 450 has a communication function, processes given information that has been transmitted from the control apparatus 100, using one or more processors (e.g. CPU (Central Processing Unit), MPU (Micro-Processing Unit, and GPU (Graphics Processing Unit)), and performs predetermined output.

A system that acquires information from a control target manufacturing apparatus and facility, and performs analysis from a macroscopic or microscopic viewpoint is conceived of as an example of the IoT service 450. For example, a machine learning tool for performing data mining to extract a certain characteristic tendency that can be found in information acquired from a control target manufacturing apparatus and facility, and performing machine learning that is based on information acquired from a control target manufacturing apparatus and facility, can be conceived of as an example of the system.

The control apparatus 100 may be connected to another control apparatus 100 so as to be communicable therewith.

Figure 2:
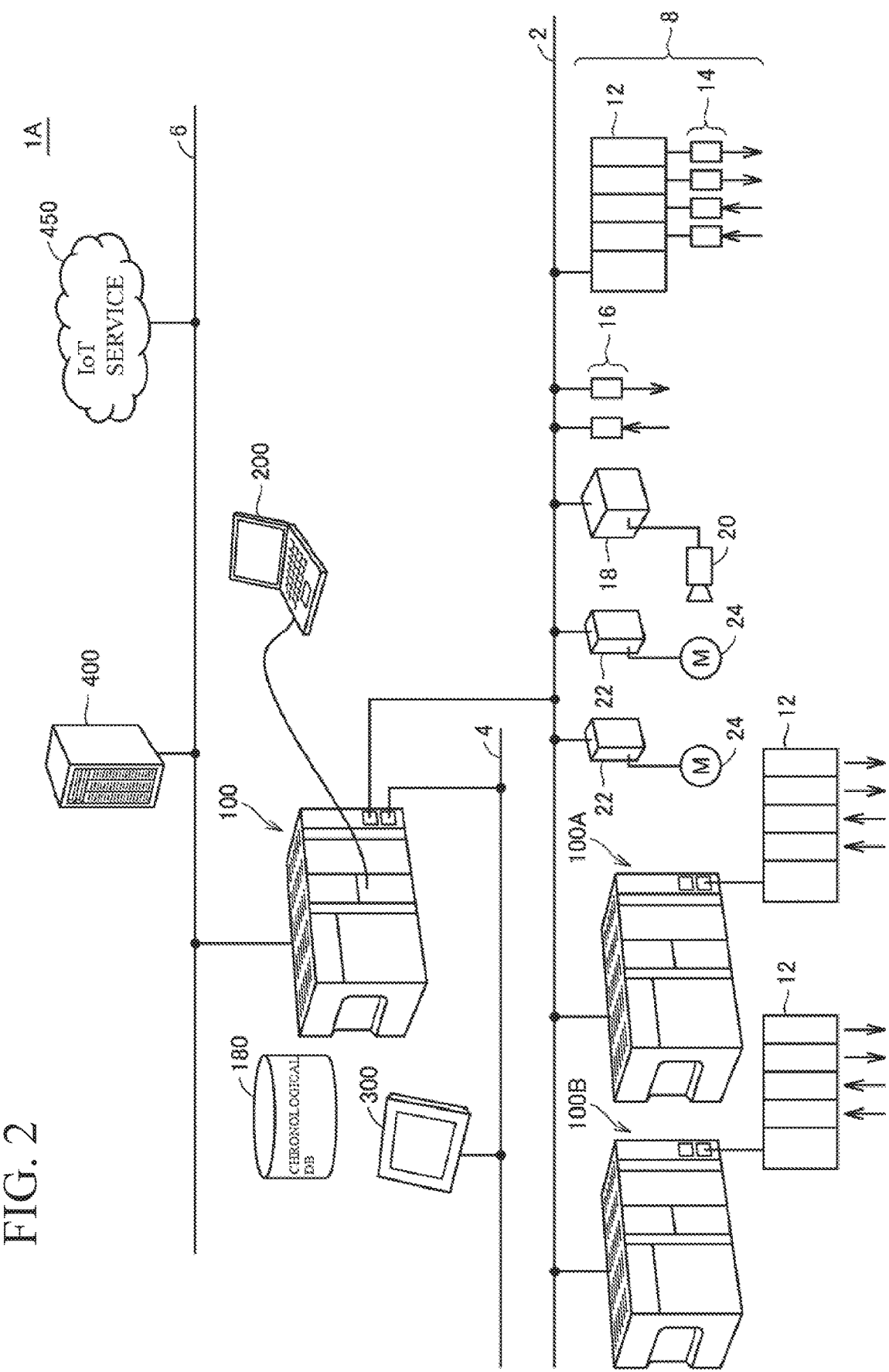
FIG. 2 is a schematic diagram illustrating an example of an overall configuration of a control system according to a modification of one or more embodiments.

FIG. 2 is a schematic view showing an example of an overall configuration of a control system 1A according to a modification of one or more embodiments. The control system 1A shown in FIG. 2 is different from the control system 1 shown in FIG. 1 in that two control apparatuses 100A and 100B are connected to the field bus 2.

For example, remote I/O apparatuses 12 are respectively connected to the control apparatuses 100A and 100B, and the control apparatuses 100A and 100B collect input data from a field and output data to the field, via the remote I/O apparatuses 12.

Also, as with the control apparatus 100, each of the control apparatuses 100A and 100B may have a chronological database 180. If this is the case, chronological data stored in the respective chronological databases 180 of the control apparatuses 100A and 100B may be aggregated in the control apparatus 100. Processing that is performed to aggregate chronological data stored in the chronological database 180 will be described later in detail.

B. Example of Hardware Configuration of Control Apparatus

Next, an example of a hardware configuration of the control apparatus 100 included in the control system 1 according to one or more embodiments will be described.

Figure 3:
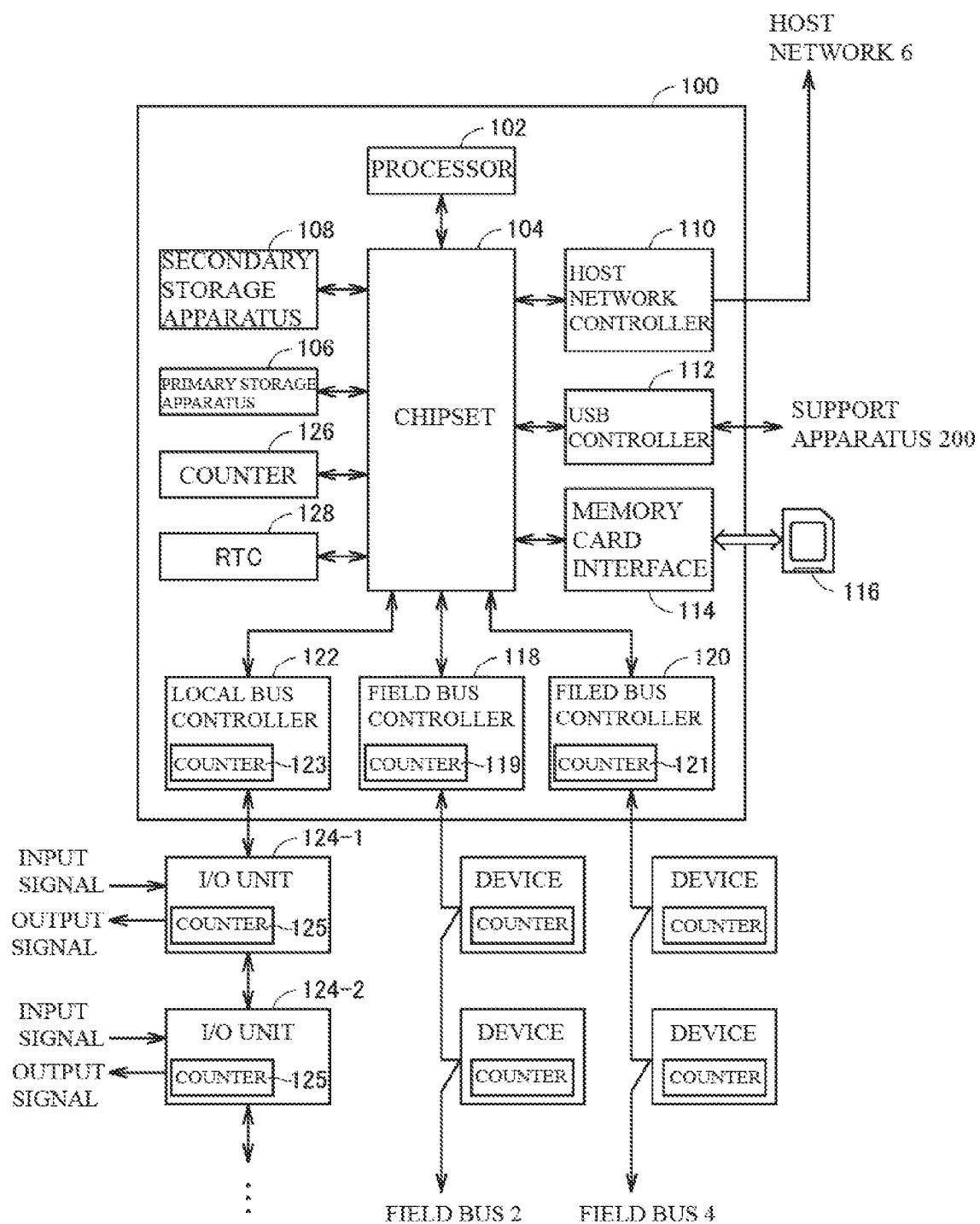
FIG. 3 is a block diagram illustrating an example of a hardware configuration of a control apparatus that is included in a control system according to one or more embodiments.

FIG. 3 is a block diagram showing an example of a hardware configuration of the control apparatus 100 included in the control system 1 according to one or more embodiments. As shown in FIG. 3, the control apparatus 100 includes a computation processing part and one or more I/O units 124-1, 124-2, and so on.

The control apparatus 100 includes a processor 102, a chipset 104, a primary storage apparatus 106, a secondary storage apparatus 108, a host network controller 110, a USB (Universal Serial Bus) controller 112, a memory card interface 114, a local bus controller 122, field bus controllers 118 and 120, a counter 126, and an RTC (Real Time Clock) 128.

The processor 102 includes, for example, a CPU, an MPU, or a GPU, and performs control that corresponds to a control target and various kinds of processing, which will be described below, by reading out various kinds of programs that are stored in the secondary storage apparatus 108, loading the programs to the primary storage apparatus 106, and executing the programs. The secondary storage apparatus 108 includes, for example, a non-volatile storage apparatus such as an HDD (Hard Disk Drive) or an SSD (Solid State Drive). The primary storage apparatus 106 includes, for example, a volatile storage apparatus such as a DRAM (Dynamic Random Access Memory) or an SRAM (Static Random Access Memory).

The chipset 104 controls the processor 102 and the devices to realize the entirety of the processing that is performed by the control apparatus 100.

The secondary storage apparatus 108 stores, in addition to system programs for basic functions, user programs that are created for a control target manufacturing apparatus and facility. The secondary storage apparatus 108 also stores a chronological database, which will be described below.

The host network controller 110 transmits and receives data to and from the manufacturing execution system 400 and the IoT service 450 (see FIG. 1) via the host network 6. The USB controller 112 controls transmission and reception of data to and from the support apparatus 200 via USB connection.

The memory card interface 114 is configured such that a memory card 116 can be attached to and detached from the memory card interface 114, and can write data to the memory card 116 and read out various kinds of data (e.g. user programs and trace data) from the memory card 116.

The counter 126 is used as a time reference to manage the execution timing of various kinds of processing that are performed in the control apparatus 100. Typically, the counter 126 increments or decrements a counter value at intervals of a predetermined period. The counter 126 may be implemented using, for example, an HPET (High Precision Event Timer), which is a hardware timer disposed on a system bus that drives the processor 102, or a dedicated circuit such as an ASIC (Application Specific Integrated Circuit) or an FPGA (Field-Programmable Gate Array).

The RTC 128 is a kind of counter that has a timing function, and provides the current time to the processor 102 and so on.

The local bus controller 122 is an interface that is mounted on the control apparatus 100 and transmits and receives data to and from the I/O units 124-1, 124-2, and so on. The local bus controller 122 includes a counter 123 that is used as a time reference to manage timing with the I/O units 124-1, 124-2, and so on, which are other devices connected to the local bus controller 122 via a local bus. Similarly, each of the I/O units 124-1, 124-2, and so on also includes a counter 125 that is used as a time reference to manage timing with the local bus controller 122 and other I/O units. The counter 123 and the counters 125 may have the same configuration as that of the counter 126 described above.

The field bus controller 118 controls data transmission and reception to and from another device via the field bus 2. The field bus controller 118 includes a counter 119 that is used as a time reference to manage timing with other devices.

Similarly, the field bus controller 120 transmits and receives data to and from another device via the field bus 4. The field bus controller 120 includes a counter 121 that is used as a time reference to manage timing with other devices.

Also, each device includes a counter that is used as a time reference to manage timing with the field bus controller 118 or the field bus controller 120.

The counter 119, the counter 121, and the respective counters of the devices may have the same configuration as that of the counter 126 described above.

The field bus controllers 118 and 120 function as communication masters for periodic communication that is performed via the field buses. The field bus controllers 118 and 120 sequentially monitor the difference between a counter value indicated by the counter of a device connected to a field bus, and counter values indicated by the counters 119 and 121, and output a synchronization signal to a device whose counter value is out of synchronization, to instruct the device to correct the counter value as appropriate. In this way, the field bus controllers 118 and 120 have a synchronization management function, which is the function of transmitting, to devices, an instruction to match the counter values indicated by the counters of the devices with the counter values indicated by the counters 119 and 121.

As described below, in the control apparatus 100 according to one or more embodiments, the counter 126 includes a counter circuit that employs an HPET (corresponding to a hardware counter (C-HW) 516 in FIG. 5) and a counter circuit that employs an FPGA (an interruption counter (C-IOP) 512 in FIG. 5), which achieves a higher degree of precision than the HPET.

Although FIG. 3 shows an example of a configuration in which necessary functions are provided by the processor 102 executing programs, at least one or all of the functions that can be thus provided may be implemented using a dedicated hardware circuit (e.g. an ASIC or an FPGA). Alternatively, the main part of the control apparatus 100 may be realized using hardware that conforms to a general-purpose architecture (e.g. an industrial-purpose personal computer that is based on a general-purpose personal computer). If this is the case, it is possible to execute a plurality of OSs (Operating Systems) for different purposes in parallel and execute necessary application software on each OS, using virtualization technology.

In the control system shown in FIGS. 1 and 2 described above, the control apparatus 100, the support apparatus 200, and the display apparatuses 300 are configured as separate apparatuses. However, it is possible to employ a configuration in which all or at least one of the functions of these apparatuses are aggregated in a single apparatus.

C. Example of Software Configuration of Control Apparatus

Next, an example of a software configuration of the control apparatus 100 included in the control system 1 according to one or more embodiments will be described.

Figure 4:
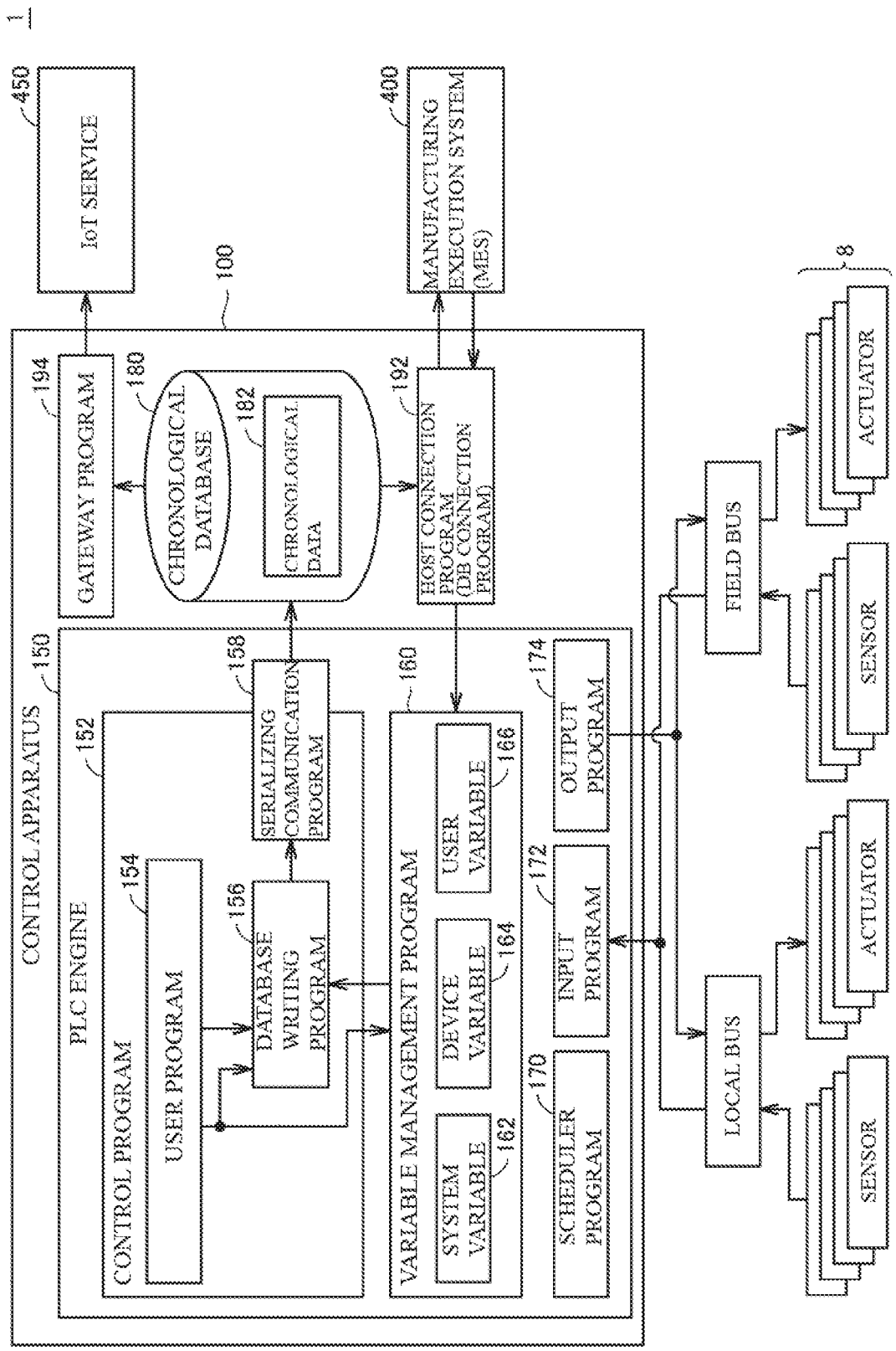
FIG. 4 is a block diagram illustrating an example of a software configuration of a control apparatus that is included in a control system according to one or more embodiments.

FIG. 4 is a block diagram showing an example of a software configuration of the control apparatus 100 included in the control system 1 according to one or more embodiments. As shown in FIG. 4, the control apparatus 100 includes a PLC engine 150, the chronological database 180, a host connection program 192, and a gateway program 194.

Typically, the processor 102 of the control apparatus 100 provides the PLC engine 150 with an execution environment for various kinds of programs by reading out system programs stored in the secondary storage apparatus 108, loading the system programs to the primary storage apparatus 106, and executing the system programs. The PLC engine 150 can execute various kinds of programs in the execution environment.

More specifically, the PLC engine 150 includes control programs 152, a variable management program 160, a scheduler program 170, an input program 172, and an output program 174. The variable management program 160, the scheduler program 170, the input program 172, and the output program 174 may be implemented as programs included in the system programs. If this is the case, the functions respectively provided by these programs may be provided by a single system program.

Typically, the control programs 152 include a user program 154, a database writing program 156, and a serializing communication program 158. The user program 154 is a main part that provides the control computation function, and may have any configuration according to the control target manufacturing apparatus and facility of the control apparatus 100. The user program 154 may be defined using ladder logic or the like that employs a function block or the like.

The database writing program 156 is called using an instruction that is defined in the user program 154, and writes specified data to the chronological database 180.

The serializing communication program 158 performs serializing processing on data that is written by the database writing program 156 to the chronological database 180. More specifically, the serializing communication program 158 performs processing (serialization) to convert chronological data to a sequence of bytes that can be stored. The target data is converted to a predetermined sequence of bytes through serializing processing, and is then stored in the chronological database 180. Note that serializing processing is not necessarily performed, depending on the speed of data writing to the chronological database 180 and the amount of data. That is, the serializing communication program 158 is an optional component.

The variable management program 160 manages values that are available to the PLC engine 150, as variables. More specifically, the variable management program 160 manages: system variables 162 that indicate the state of the control apparatus 100, for example; device variables 164 that indicate values that are held by various devices connected to the control apparatus 100 via the local bus or the field bus; and user variables 166 that indicate values held by the user program 154 executed in the control apparatus 100.

The scheduler program 170 manages resource allocation and execution timing with respect to processes and tasks that are executed in the control apparatus 100.

The input program 172 provides the function of acquiring input data from various devices connected to the control apparatus 100 via the local bus or the field bus.

The output program 174 outputs instruction values (output data) computed by the user program 154 executed in the control apparatus 100, to a target device connected to the control apparatus 100 via the local bus or the field bus.

Typically, the chronological database 180 is disposed in the primary storage apparatus 106 or the secondary storage apparatus 108 (see FIG. 3), and is equipped with the function of storing data as well as a search function, which is the function of returning specified data in response to an external request (query). The chronological database 180 stores chronological data 182 that is written by the database writing program 156. That is, the chronological database 180 stores at least one of: input data; output data; computation data computed through control computation performed by the control programs 152; manufacturing data; and event data, in chronological order.

Note that the PLC engine 150 may further include a statistical recording program that performs statistical processing on input data, output data, computation data, manufacturing data, event data, and so on that are managed by the control apparatus 100, and then writes the result to the chronological database 180. For example, an approach such as PAA (Piecewise Aggregate Approximation), or SAX (Symbolic Aggregate Approximation), which is symbolization performed to obtain a discrete string, may be employed as an example of statistical processing. PAA makes it possible to find a pattern from chronological data, and uses the pattern thus found to facilitate data compression. SAX converts chronological data to a character string, and thus makes it easier to perform data compression and find a pattern.

The host connection program 192 transmits and receives data to and from an external apparatus that is connected to the host network 6, such as the manufacturing execution system 400. The control apparatus 100 according to one or more embodiments outputs input data and computation data to the manufacturing execution system 400, and receives manufacturing information from the manufacturing execution system 400. In this way, the host connection program 192 provides a manufacturing data acquisition function, which is the function of acquiring manufacturing data from the manufacturing execution system 400 that is associated with a control target.

If the manufacturing execution system 400 has a database, or if a database is disposed separately from the manufacturing execution system 400, a database connection program may be provided instead of the host connection program 192, or as a part of the host connection program 192. Such a database connection program may perform, for example, processing to transmit a query such as SQL to a relational database, and receive a response.

The gateway program 194 provides chronological data to the IoT service 450. Specifically, the gateway program 194 acquires a specified type of data at specified intervals from the chronological database 180, and outputs the acquired data as chronological data. The details of chronological data that is output from the gateway program 194 to the IoT service 450 will be described later.

The input program 172 of the control apparatus 100 acquires input data from sensors via the local bus and/or the field bus.

The host connection program 192 of the control apparatus 100 acquires manufacturing data from the manufacturing execution system 400. The variable management program 160 manages the input data and manufacturing data thus acquired, as variables.

The user program 154 executes previously-specified control computation with reference to the system variables 162, the device variables 164, and the user variables 166 that are managed by the variable management program 160, and outputs the results of execution (output data) to the variable management program 160.

The output program 174 outputs output data computed through control computation performed by the user program 154, to actuators via the local bus and/or the field bus, as control output.

The database writing program 156 writes observation values that have been specified from among the variables that are managed by the variable management program 160, to the chronological database 180.

The host connection program 192 outputs the values of variables that have been specified from among the variables that are managed by the variable management program 160, and/or data specified from the chronological data 182 stored in the chronological database 180, to the manufacturing execution system 400, as chronological data.

The gateway program 194 outputs the values of variables that have been specified from among the variables that are managed by the variable management program 160, and/or data specified from the chronological data 182 stored in the chronological database 180, to the IoT service 450, as chronological data. The IoT service 450 performs behavior analysis based on chronological data received from the control apparatus 100, and performs predictive maintenance on a control target facility and apparatus, for example.

D. Time Synchronization/Counter Synchronization

First, the control apparatus 100 according to one or more embodiments has the function of synchronizing clocks with each other and the function of synchronizing counters with each other (hereinafter also referred to as "time synchronization" and "counter synchronization", respectively).

In the present specification, "time" refers to a point in a time flow, and is defined using units such as hour, minute, and second. "Counter" contains a value that is used to control timing among the control apparatus 100 and apparatuses related to the control apparatus 100, and basically indicates a value that is incremented or decremented by a predetermined value at predetermined intervals of a unit time (hereinafter a value indicated by a counter is also referred to as "counter value"). Basically, the accuracy of time synchronization is lower than the accuracy of counter synchronization.

Figure 5:
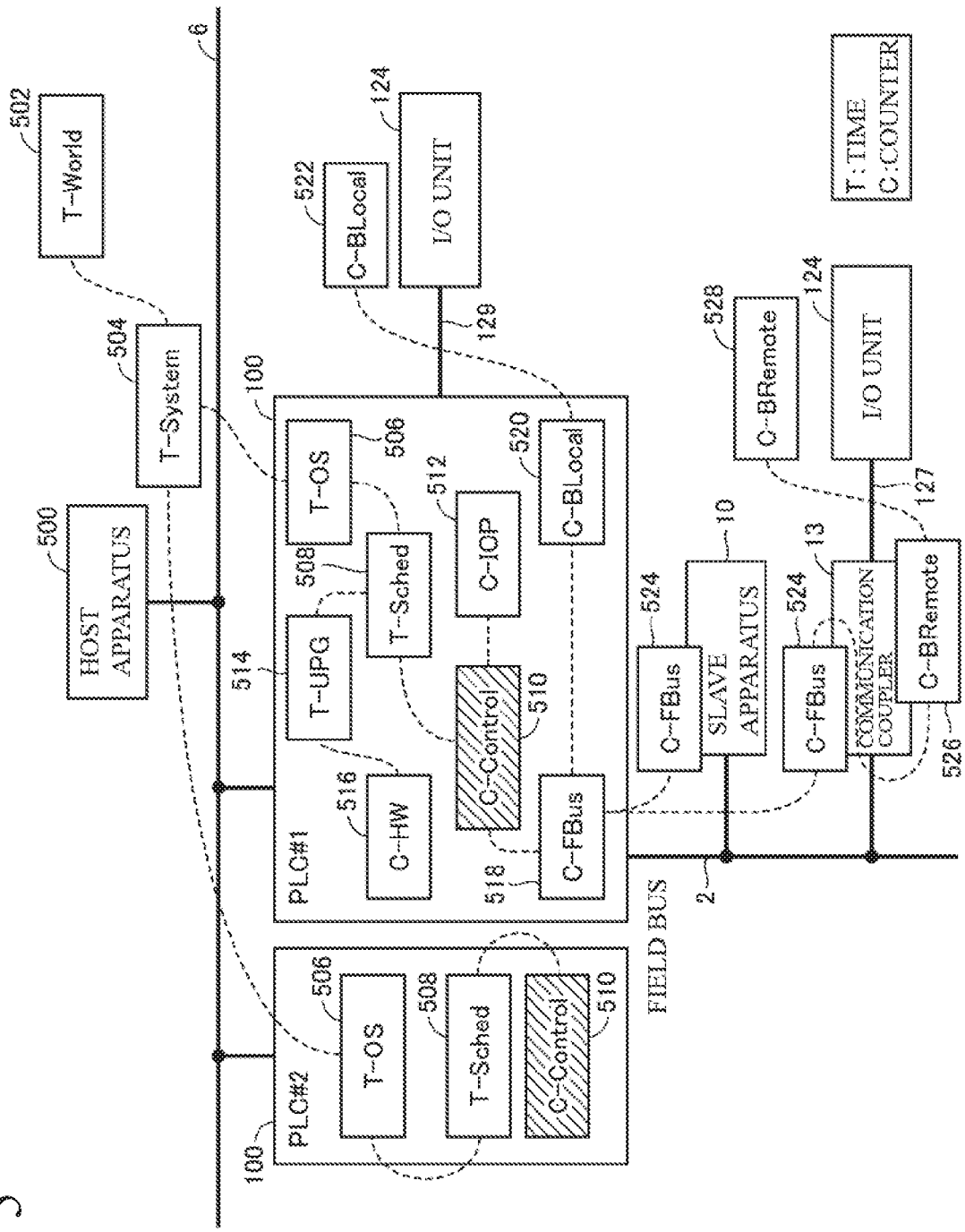
FIG. 5 is a schematic diagram illustrating examples of times and counters that are managed by control apparatuses according to one or more embodiments.

FIG. 5 is a schematic diagram showing examples of time and counters that are managed by control apparatuses 100 according to one or more embodiments. FIG. 5 shows time and counters that are managed by the control apparatuses 100 and apparatuses related to the control apparatuses 100. In FIG. 5, variables starting with "T-" indicate time and variables starting with "C-" indicate counters.

As shown in FIG. 5, absolute time (T-World) 502 is reference time, and UTC (Coordinated Universal Time) or the like is employed, for example. In a specific example of implementation, a time synchronization scheme for computer systems, such as NTP (Network Time Protocol), is employed in the control apparatus 100 and a time synchronization server that is located on the Internet or the like and manages the absolute time. For example, a host apparatus 500 is connected to the control apparatuses 100 via the host network 6. The host apparatus 500 functions as a time synchronization server for subordinates of the host apparatus 500, and internally manages system time (T-System) 504 in synchronization with the absolute time 502 that is managed by a time synchronization server that is located on the Internet.

Note that a time synchronization scheme such as NTP does not achieve perfect synchronization with the time indicated by the time synchronization server, and instead, periodically acquires reference time from the time synchronization server and sets or adjusts the system time according to the difference between the acquired reference time and the internally managed system time. As a result, the accuracy of the time that is managed by the time synchronization server (the host apparatus 500) is not very high.

Each of the control apparatuses 100 (denoted as "PLC #1" and "PLC #2" in FIG. 5) internally manages OS time (T-OS) 506 using the time synchronization server function of the host apparatus 500. More specifically, the processor 102 of a control apparatus 100 reads out time information from the RTC 128 each time the control apparatus 100 is started up or a predetermined event occurs, and holds data that indicates the OS time 506, on the primary storage apparatus 106, and also periodically updates the OS time 506 according to the internal clock. Furthermore, upon determining that the OS time 506 needs to be adjusted, the processor 102 of the control apparatus 100 changes the internally-held data that indicates the OS time 506, according to a time synchronization scheme such as NTP. In this way, each control apparatus 100 includes a time manager that manages time.

As a result, the OS time 506 is present in each control apparatus 100. It is also common that a time synchronization scheme such as NTP is employed to realize time synchronization between the control apparatus 100 and the host apparatus 500. Therefore, time may be changed and a time deviation may be corrected, at a given point in time. As a result, the accuracy of the time that is managed by the control apparatus 100 is also not very high.

The control apparatus 100 manages scheduler time (T-Sched) 508 in addition to the OS time 506. In the control apparatus 100, a program with the highest priority in each predetermined control cycle is cyclically executed. The scheduler time 508 indicates the starting time of each control cycle. More specifically, in response to an interruption that indicates the starting point of a control cycle, the processor 102 of the control apparatus 100 reads out data that indicates the OS time 506 when the interruption occurred, and stores the data on the primary storage apparatus 106 as data that indicates the scheduler time 508. Therefore, the scheduler time 508 is updated when each control cycle is started, and the value thereof does not change in each control cycle.

The control apparatus 100 provides program time (T-UPG) 514 as a time that is available to an executed program. With reference to the scheduler time 508 that indicates the starting point of each control cycle, the elapsed time in a control cycle, which has been converted from the counter value indicated by the hardware counter (C-HW) 516, is added to the program time 514, and thus the time in the control cycle can be provided. More specifically, with reference to the time at which an interruption that indicates the starting point of a control cycle occurred, the processor 102 of the control apparatus 100 calculates the elapsed time based on the counter value generated by the hardware counter 516, adds the calculated elapsed time and the data indicated by the scheduler time 508, and stores the result as data that indicates the program time 514, on the primary storage apparatus 106. The hardware counter 516 may be implemented using the counter 126 (see FIG. 3).

The starting point of each control cycle of the control apparatus 100 is managed by the interruption counter (C-IOP) 512. That is, the processor 102 corresponding to a control computation unit of the control apparatus 100 performs control computation according to the time indicated by the interruption counter 512.

The interruption counter 512 may be implemented using the counter 126 (see FIG. 3). In this way, the interruption counter 512 corresponds to a counter that causes an interruption for each predetermined control cycle and manages the execution timing of control computation.

The control cycle counter (C-Control) 510 is a counter that starts at the beginning of each control cycle. The control cycle counter 510 is managed so as to synchronize with the interruption counter 512, which serves as the master.

The interruption counter 512 and the control cycle counter 510 are unique counters implemented in the control apparatus 100, and may be implemented using an FPGA, for example. The interruption counter 512 and the control cycle counter 510 may be implemented using the counter 126 (see FIG. 3).

Regarding the control apparatus 100, counters that are respectively managed by the devices connected to the local bus and/or the field bus are configured to synchronize with the internal counters of the control apparatus 100.

A field bus counter (C-FBus) 518 functions as a master of synchronization via the field bus and the local bus. The field bus counter 518 is a unique counter implemented in the control apparatus 100, and may be implemented using an FPGA, for example. The field bus counter 518 may be implemented using the counters 119 and 121 (see FIG. 3).

The field bus counter 518 is configured such that a local bus counter (C-BLocal) 520 that is managed by a control apparatus 100, a field bus counter (C-FBus) 524 that is managed by a slave device 10 that is connected to the field bus 2, and a field bus counter (C-FBus) 524 that is managed by a communication coupler 13 that is connected to the field bus 2 synchronize with the field bus counter 518. The field bus counter 518 synchronizes with the control cycle counter 510.

The local bus counter 520 is a unique counter implemented in the control apparatus 100, and may be implemented using an FPGA, for example. The local bus counter 520 may be implemented using the counter 123 (see FIG. 3).

The field bus counters 524 are unique counters implemented to establish connection with the control apparatus 100, and may be implemented using an FPGA, for example. The field bus counters 524 may be implemented using counters that are implemented in the devices (see FIG. 3).

A local bus counter (C-BLocal) 522 that is managed by an I/O unit 124 that is connected to a local bus 129 of the control apparatus 100 synchronizes with the local bus counter 520. The local bus counter 522 is a unique counter that is implemented to establish connection with the control apparatus 100, and may be implemented using an FPGA, for example. The local bus counter 522 may be implemented using counters 125 that are implemented in the I/O units 124 (see FIG. 3).

Similarly, a remote bus counter (C-BRemote) 526 that is managed by the communication coupler 13 connected to the field bus 2 of the control apparatus 100 synchronizes with the field bus counters 524 that is managed by the communication coupler 13. Furthermore, a remote bus counter (C-BRemote) 528 that is managed by, for example, the I/O unit 124 connected to a remote bus 127 of the communication coupler 13 synchronizes with the remote bus counter 526 that is managed by the communication coupler 13. The remote bus counters 526 and 528 are unique counters implemented to establish connection with the control apparatus 100, and may be implemented using an FPGA, for example. The remote bus counters 526 and 528 may be implemented using counters that are implemented in the devices (see FIG. 3).

In this way, the field bus counters (C-FBus), the local bus counters (C-BLocal), and the remote bus counters (C-BRemote) are counters (e.g. the counters 119, 121, and 123 shown in FIG. 3) that manage data communication timing in a bus or a network for periodic communication that is performed to establish connection with another control apparatus.

As described above, the control cycle counter 510 and the interruption counter 512 that are managed inside the control apparatus 100 synchronize with the counters that are managed by the devices connected via the local bus 129, the devices connected via the field bus 2, and the counters that are managed by the devices that are connected via the remote bus 127, from any of the devices that are connected via the field bus 2. Therefore, the timing of collection and output performed by each device can be specified using the values of the counters that synchronize with each other, and thus the mutual relationship regarding timing can be known independent of how the devices are connected to each other.

In this way, the control apparatus 100 includes one or more counters that synchronize with one or more apparatuses or devices.

Figure 6A:
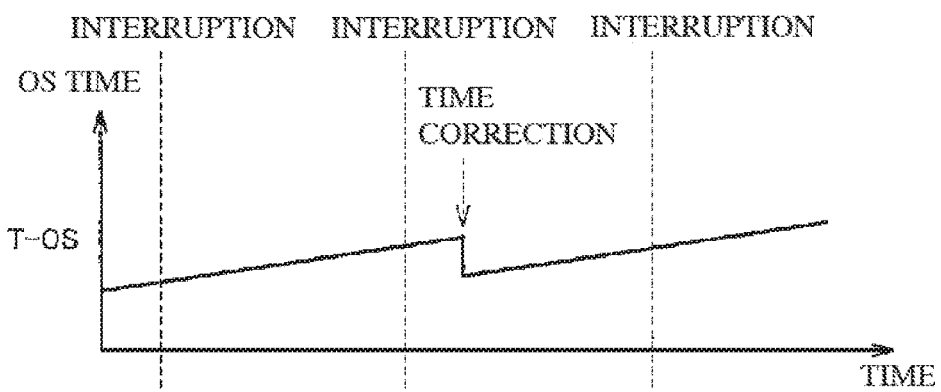
FIGS. 6A to 6D are diagrams illustrating examples of temporal changes in times and counter values that are managed by a control apparatus, such as in FIG. 5.

FIGS. 6A to 6D are diagrams showing examples of temporal changes in time and counter values that are managed by a control apparatus 100 shown in FIG. 5. FIG. 6A shows an example of temporal changes in the OS time (T-OS) 506. The OS time 506 may be subjected to regular or irregular time correction, for example.

Figure 6B:
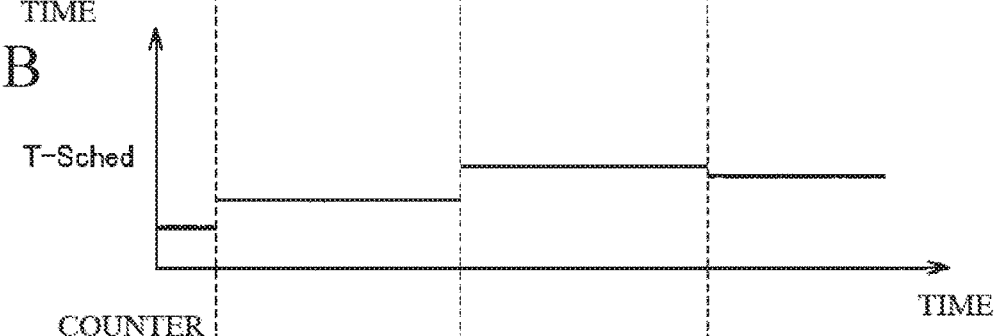

FIG. 6B shows an example of temporal changes in the scheduler time (T-Sched) 508. The scheduler time 508 may be latched to the OS time 506 at the starting point of each control cycle. The scheduler time 508 is a reference that is used to determine the time in each control cycle, and therefore the scheduler time 508 is not updated within the same control cycle.

Figure 6C:
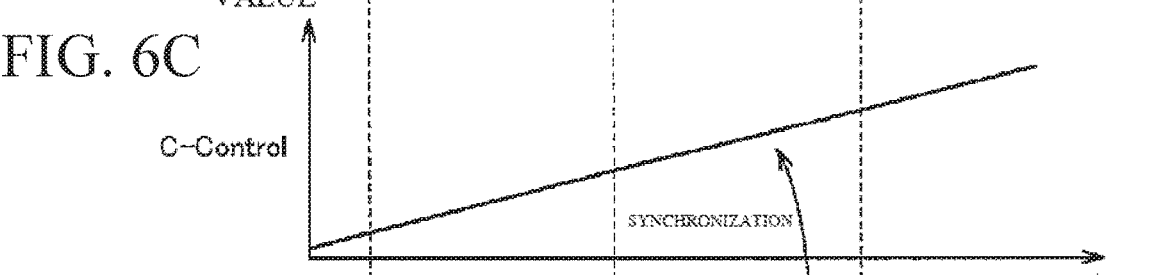

FIG. 6C shows an example of temporal changes in the control cycle counter (C-Control) 510. The counter value of the control cycle counter 510 changes according to a predetermined rate (count per unit time).

Figure 6D:
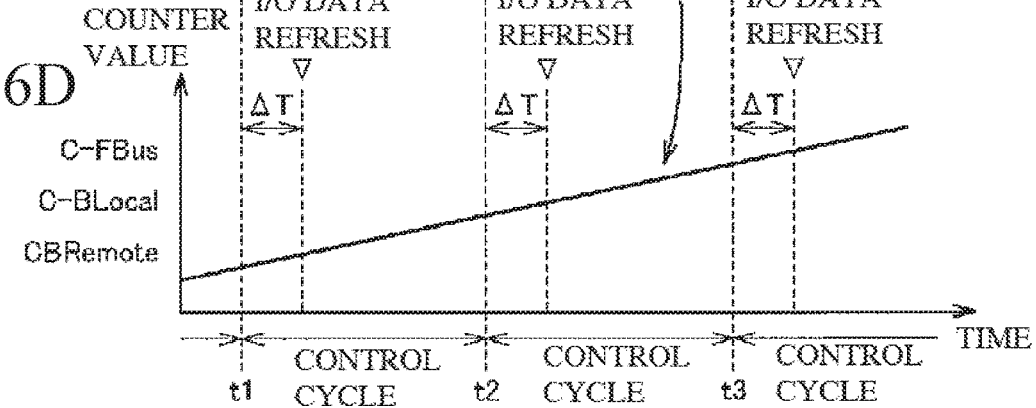

FIG. 6D shows an example of temporal changes in the field bus counter (C-FBus), the local bus counter (C-BLocal), and the remote bus counter (C-BRemote). These counters synchronize with the control cycle counter 510, and are managed so as to show changes that are the same as the changes in the counter value of the control cycle counter 510.

In the control apparatus 100 according to one or more embodiments, the counter values of these counters are adjusted and managed so as to be the same. The counter values are not necessarily managed so as to be the same value. However, considering convenience at the time of ex-post aggregation of chronological data, the counter values are preferably adjusted to be the same.

The control apparatus 100 and the apparatuses connected to the control apparatus 100 have counters that synchronize with each other. Therefore, for example, they can perform an I/O refresh operation upon a predetermined time ΔT elapsing with reference to the respective starting points of the control cycles (time points t1, t2, t3, and so on). In this way, the I/O refresh operations are executed in synchronization with each other, and therefore, even if chronological data is aggregated afterward, the accuracy of timing with respect to the collected pieces of data can be guaranteed.

E. Data Structure

Next, the following describes an example of the data structure of the chronological data 182 stored in the chronological database 180 of the control apparatus 100 according to one or more embodiments. FIGS. 7A and 7B are diagrams showing an example of the data structure of the chronological data 182 stored in the chronological database 180 of the control apparatus 100 according to one or more embodiments.

The control apparatus 100 has the record generation function, which is the function of generating a record that includes an observation value related to a control target, a time that is associated with the observation value and is indicated using a time management function, and a counter value that is indicated by any of the counters and is associated with the observation value. The observation value is a value that is available to the processor 102. More specifically, as shown in FIG. 7A, a record included in the chronological data 182 output from the control apparatus 100 includes a time field 1821, a counter value field 1822, an index field 1823, and an observation value field 1824.

The time field 1821 and the counter value field 1822 store information that indicates the time when the data (one or more observation values) corresponding thereto was acquired.

More specifically, the time field 1821 stores the time at which the data corresponding thereto was acquired (e.g. the scheduler time 508 or the program time 514 in FIG. 5).

The counter value field 1822 stores the counter value of the counter that is managed by the control apparatus 100 as of the time the data corresponding thereto was acquired, or at least one of the counter values of the counters that mange timing in the field bus and the local bus (e.g. the counter values indicated by the field bus counters (C-FBus), the local bus counters (C-BLocal), and the remote bus counters (C-BRemote) shown in FIG. 5).

In this way, a record included in the chronological data 182 has a data structure that includes an observation value related to a control target, a time that is associated with the observation value, and a counter value that is associated with the observation value.

In the control apparatus 100 according to one or more embodiments, the time is stored in the time field 1821, and a counter value is stored in the counter value field 1822. Therefore, it is possible to support ex-post analysis of the data (observation values) corresponding thereto. The method for using this support for ex-post analysis will be further described later.

The index field 1823 stores a value (an index value) that is incremented/decremented by a predetermined value upon a record being written to the database, for example. Typically, a value that is incremented by one each time a record is stored is employed. For example, if an instruction to start up the database writing program 156 is written in the user program 154, the index value may be incremented upon the startup program being executed. Also, if a plurality of chronological databases 180 are provided, an independent index value may be used for each database.

The observation value field 1824 stores specified data (one or more observation values). Examples of data that is stored in the observation value field 1824 include input data, output data, computation data, manufacturing data, and event data.

Specifically, examples of input data include digital signals (status values) and analogue signals (various kinds of measurement signals) acquired from various kinds of sensors. In addition to observation values, information that specifies the sensors that have output the observation values may be stored as well.

As output data, instruction values that are output to a motion drive, an opening adjuster, and so on may be stored, for example. In addition to instruction values, information that specifies actuators to which the instruction values are output may be stored as well.

As computation data, for example, variable values and transition values that are computed upon the user program 154 being executed may be stored. In addition to variable values and transition values, information that specifies the user program 154, a task, or the like that output the computation data may be stored as well.

As manufacturing data, execution instruction values (e.g. the item number, lot number, recipe number, and so on of a work) that have been received from the manufacturing execution system 400 may be stored. Examples of the execution instruction values may include an identification number that uniquely specifies a piece of work or information that specifies a work type.

As event data, for example, information indicating that an observation value exceeds or falls below a predetermined threshold value, or information indicating that a predetermined abnormality flag or the like has been turned on may be stored. Information such as values that have generated event data may also be included.

Furthermore, event data may not be chronological data that is repeatedly generated or stored at predetermined intervals, and may be generated when a predetermined condition is satisfied. Even in this case, the values of counters that synchronize with each other and/or times may be associated therewith.

The above-described records are generated and output in each control cycle or each time a predetermined event occurs. For example, FIG. 7B shows an example in which a record is generated and output every 500 μsec. In this way, records that include specified observation values are generated and output in chronological order, which allows for various kinds of analyses based on the pieces of chronological data.

The records of the chronological data 182 shown in FIGS. 7A and 7B may be of a key-value type. If this is the case, for example, the time field 1821 and the counter value field 1822 may be keys, and the index field 1823 and the observation value field 1824 may be values. That is, each record of the chronological data 182 may include a time and a counter value associated with observation values as keys, and the observation values as values corresponding to the keys.

The description above illustrates a typical example in which the control apparatus 100 performs processing to store records in the chronological database 180 that the control apparatus 100 has. However, the control apparatus 100 may transmit records to an external apparatus. Even in this case, a record such as those shown in FIGS. 7A and 7B is generated in each control cycle, and is transmitted to the destination external apparatus. Each record stores a time and a counter value associated with observation values. Therefore, even if there is a delay in the transmission of a record from the control apparatus 100 to the external apparatus, there is no influence on ex-post data collection at all.

F. Application Examples Using Chronological Data

Next, the following describes several application examples that use the chronological data 182 generated and output by the control apparatus 100 according to one or more embodiments.

f1: Use of Single Chronological Database

Figure 8:
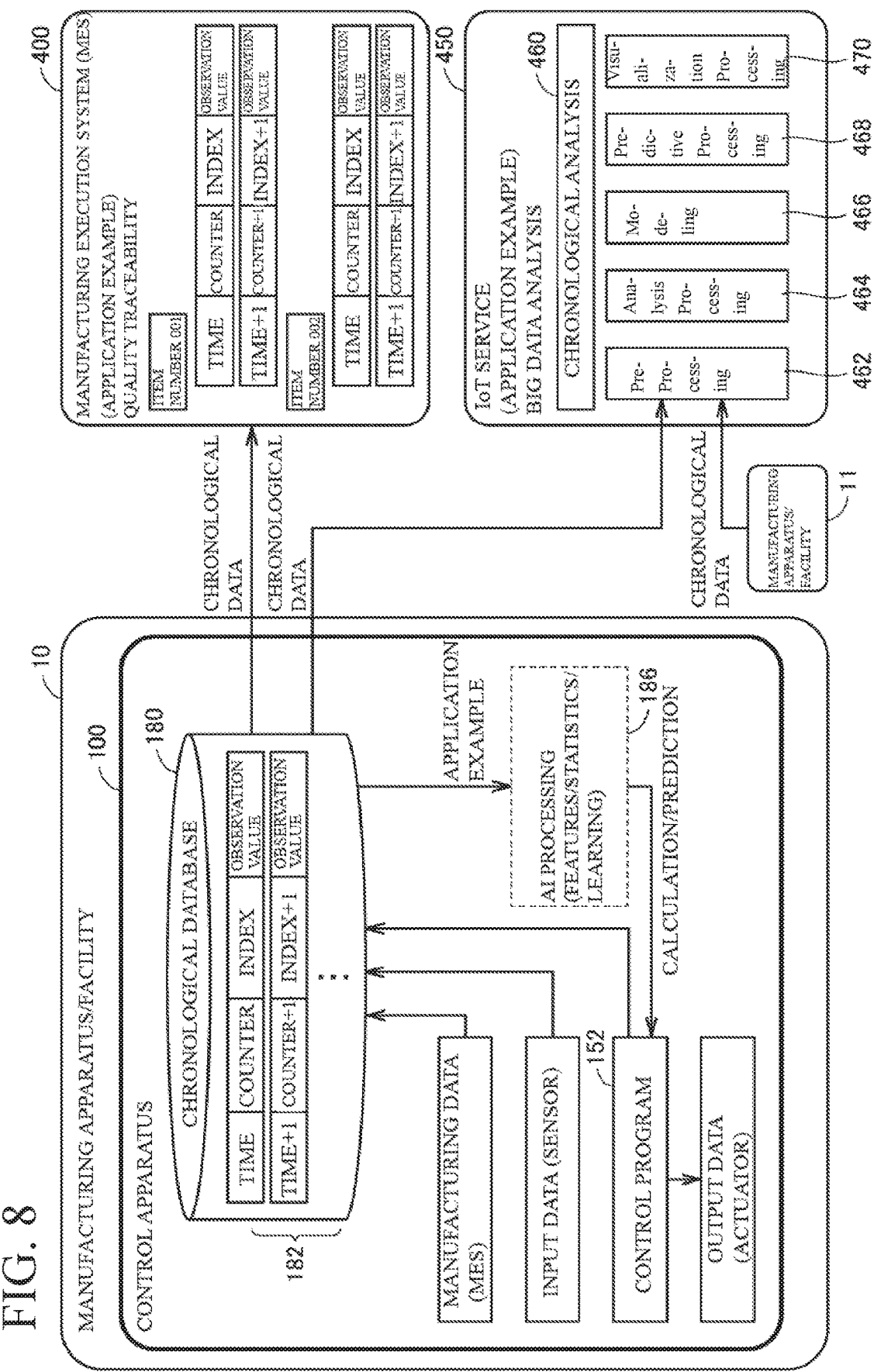
FIG. 8 is a diagram illustrating an example of application software that uses chronological data stored in a chronological database of a control apparatus according to one or more embodiments.

First, the following describes an application example that uses the chronological data 182 stored in the chronological database 180 of the control apparatus 100 according to one or more embodiments. FIG. 8 is a diagram illustrating an application example that uses the chronological data stored in the chronological database 180 of the control apparatus 100 according to one or more embodiments.

In the example shown in FIG. 8, the manufacturing execution system 400 realizes quality traceability by using the chronological data 182 stored in the chronological database 180 of the control apparatus 100. Specifically, it is determined which piece of work (manufactured product) chronological data 182 stored in the chronological database 180 is associated with, based on the manufacturing data stored in the chronological data 182. Pieces of chronological data of each piece of work thus determined are arranged in order of generation. Thus, it is possible to know the state of each piece of work at the time of manufacturing. For example, FIG. 8 shows an example in which a plurality of pieces of chronological data are stored in association with a piece of work indicated by "item number 001" and a plurality of pieces of chronological data are stored in association with a piece of work indicated by "item number 002".

In this way, the manufacturing execution system 400 may generate information regarding quality traceability based on the chronological data 182 stored in the chronological database 180 of the control apparatus 100.

When generating information regarding quality traceability, the manufacturing execution system 400 may generate more precise information in terms of time by processing observation values in the chronological data in association with time and counter information.

In the example shown in FIG. 8, the IoT service 450 realizes so-called big data analysis. Not only the chronological data from the control apparatus 100 that controls a manufacturing apparatus/facility 11, but also chronological data from another manufacturing apparatus/facility 11 is output to the IoT service 450. The IoT service 450 performs various kinds of analyses on pieces of chronological data received from one or more manufacturing apparatuses/facilities. A chronological analysis 460 is shown as an example of such an analysis.

One or more processors that constitute a system that provides the IoT service 450 execute the chronological analysis 460. In the chronological analysis 460, the one or more processors execute pre-processing 462 on the chronological data. In pre-processing 462, the one or more processors perform processing to extract features or the likes from the chronological data stored in the storage to lower the dimension of the chronological data, processing to remove abnormal values and outliers, and so on. Furthermore, the one or more processors perform analysis processing 464 on the chronological data that has been subjected to pre-processing 462. The one or more processors perform modeling 466 based on the results of analysis processing 464 to generate a model of the control target manufacturing apparatus/facility. The one or more processors store the generated model (a set of functions or parameters) in the storage. Furthermore, the one or more processors execute prediction processing 468 to predict the occurrence of abnormalities or progress of degradation, based on the generated model. Finally, the one or more processors may visually display the results of prediction processing 468 on a display or the like, using graphs, tables, or the like (visualization processing 470).

As described above, the IoT service 450 performs data analysis based on the chronological data 182 stored in the chronological database 180 of the control apparatus 100. Typically, the IoT service 450 as described above is implemented in a cloud-based environment that includes sufficient computation resources. Therefore, it is possible to find hidden characteristics or the like using a large amount of chronological data.

When performing such data analysis, it is possible to precisely determine the temporal relationship between observation values in the chronological data by associating the time and counter information with the observation values. Therefore, it is possible to perform accurate and meaningful analysis. For example, when generating a model, it is important to search for a hidden causal relationship between observation values. However, there are cases in which it is impossible to find such a causal relationship due to a time deviation. With the system according to one or more embodiments, it is possible to more accurately determine the temporal relationship between observation values in the pre-processing, and therefore it is possible to generate a more accurate model.

The system is more useful when, for example, it is necessary to refer to the time at which a certain abnormality occurred and check the facility data at the time when the abnormality occurred.

In the example shown in FIG. 8, AI (Artificial Intelligence) processing 186 is also performed in the control apparatus 100. In the AI processing 186, supervised machine learning may be performed in advance, for example, and abnormalities and the tendency of degradation to occur in the control target manufacturing apparatus and facility may be detected in advance.

Specifically, the AI processing 186 is performed to generate features from one or more observation values included in the chronological data 182 stored in the chronological database 180 of the control apparatus 100, subject the generated features to statistical processing, and hold the result as learning data. Then, upon a certain new observation value being input, the AI processing 186 is performed to compute the degree of deviation indicating how much the input observation value deviates from the learning data, and determine the presence or absence of an abnormality and the tendency of degradation based on the degree of deviation thus computed.

Due to the AI processing 186 being implemented in the control apparatus 100, it is possible to detect abnormalities and the tendency of degradation occurring in the control target manufacturing apparatus and facility, substantially in real time.

f2: Aggregation of Chronological Data from a Plurality of Control Apparatuses: Part 1

Next, the following describes an application example that uses a plurality of chronological databases 180 of the control apparatus 100 according to one or more embodiments.

Figure 9:
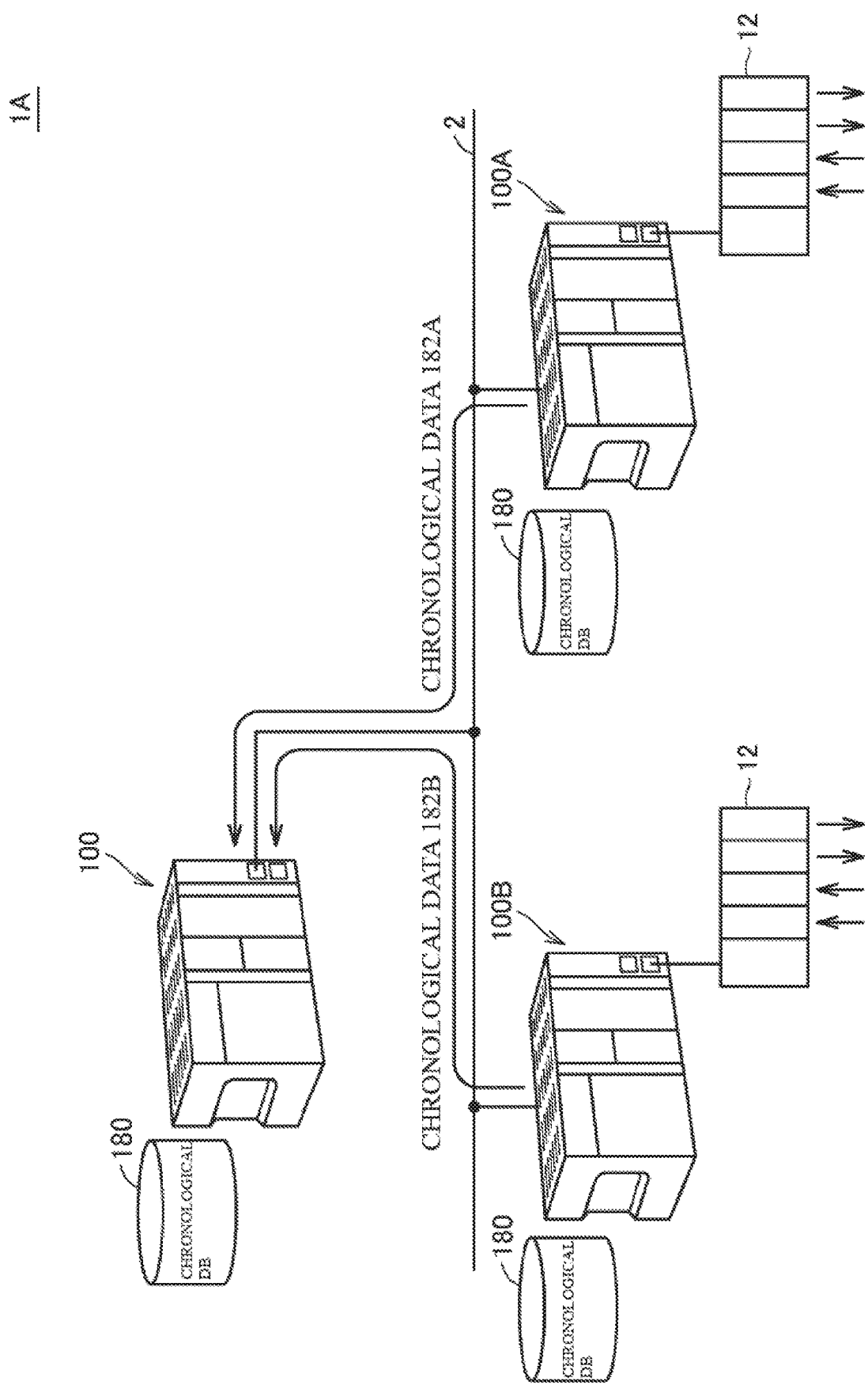
FIG. 9 is a schematic diagram illustrating a main part of a control system, such as in FIG. 2.

FIG. 9 is a schematic diagram showing a main part of the control system 1A shown in FIG. 2. As shown in FIG. 9, for example, the two control apparatuses 100A and 100B are connected to the field bus 2 that is managed by the control apparatus 100 serving as the master in terms of counter synchronization. The control apparatuses 100A and 100B transmit, to the control apparatus 100, pieces of chronological data 182A and 182B including, for example, observation values collected by the respective remote I/O apparatuses 12.

The pieces of chronological data respectively transmitted by the control apparatuses 100A and 100B have the data structure shown in FIGS. 7A and 7B. That is, each observation value is at least associated with a time and a counter value.

Figure 10:
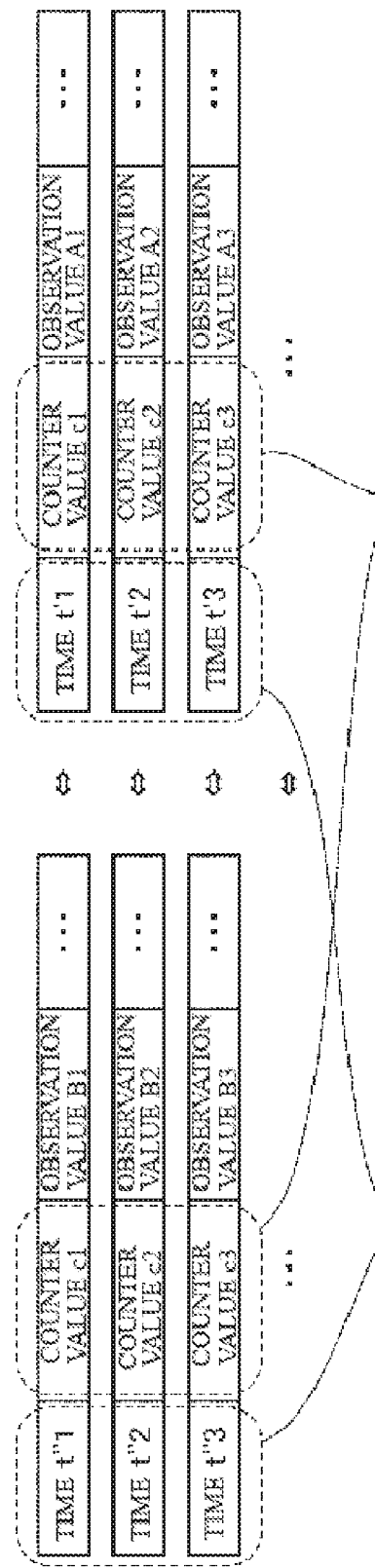
FIG. 10 is a schematic diagram illustrating an example of chronological data that is aggregated in a control apparatus in a control system, such as in FIG. 9.

FIG. 10 is a schematic diagram showing an example of chronological data that is aggregated in the control apparatus 100 in the control system 1A shown in FIG. 9. As shown in FIG. 10, the chronological data transmitted from the control apparatus 100A and the chronological data transmitted from the control apparatus 100B each include observation values that are respectively associated with times and counter values.

Note that the pieces of chronological data shown in FIG. 10 are not necessarily temporarily stored in the chronological databases 180 of the control apparatuses 100A and 100B, and each of the control apparatuses 100A and 100B may generate and transmit chronological data at predetermined intervals (e.g. in each control cycle).

In the pieces of chronological data shown in FIG. 10, the times respectively associated with the observation values are separately managed by the control apparatuses 100A and 100B, and do not perfectly synchronize with each other. That is, perfect synchronization is not guaranteed regarding the times.

In contrast, in the control system 1A shown in FIG. 9, the control apparatus 100, the control apparatus 100A, and the control apparatus 100B perform counter synchronization via the field bus 2, and the counters synchronize with each other with high accuracy. Therefore, the counter values added to the pieces of chronological data of the control apparatuses also synchronize with each other. Therefore, the pieces of data are guaranteed to be the same in terms of timing. That is, even if observation values are individually collected by different control apparatuses, aggregation and analysis can be performed in conformity with a substantially same time axis.

Although not shown in the figure, counter values that are in synchronization with those of the control apparatuses 100A and 100B may also be added to the observation values collected by the control apparatus 100. Therefore, the pieces of chronological data transmitted from the control apparatuses 100A and 100B and the chronological data collected by the control apparatus 100 are also guaranteed to be the same in terms of timing.

f3: Aggregation of Chronological Data from a Plurality of Control Apparatuses: Part 2

Regarding the control system 1A shown in FIG. 9 described above, an example in which chronological data transmitted from control apparatuses connected to a field bus is aggregated. However, chronological data may be aggregated in an external apparatus or an external system such as an IoT service.

Figure 11A:
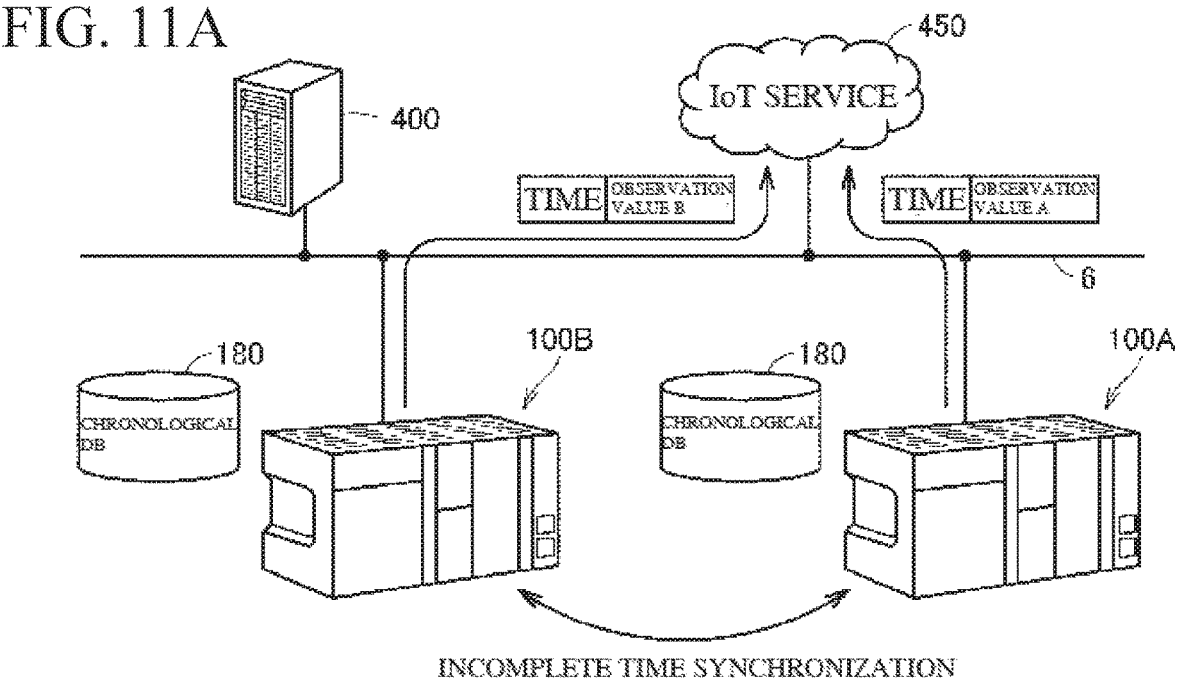
FIGS. 11A and 11B are schematic diagrams illustrating examples of processing that is performed when control apparatuses according to one or more embodiments transmit chronological data to an external system.
Figure 11B:
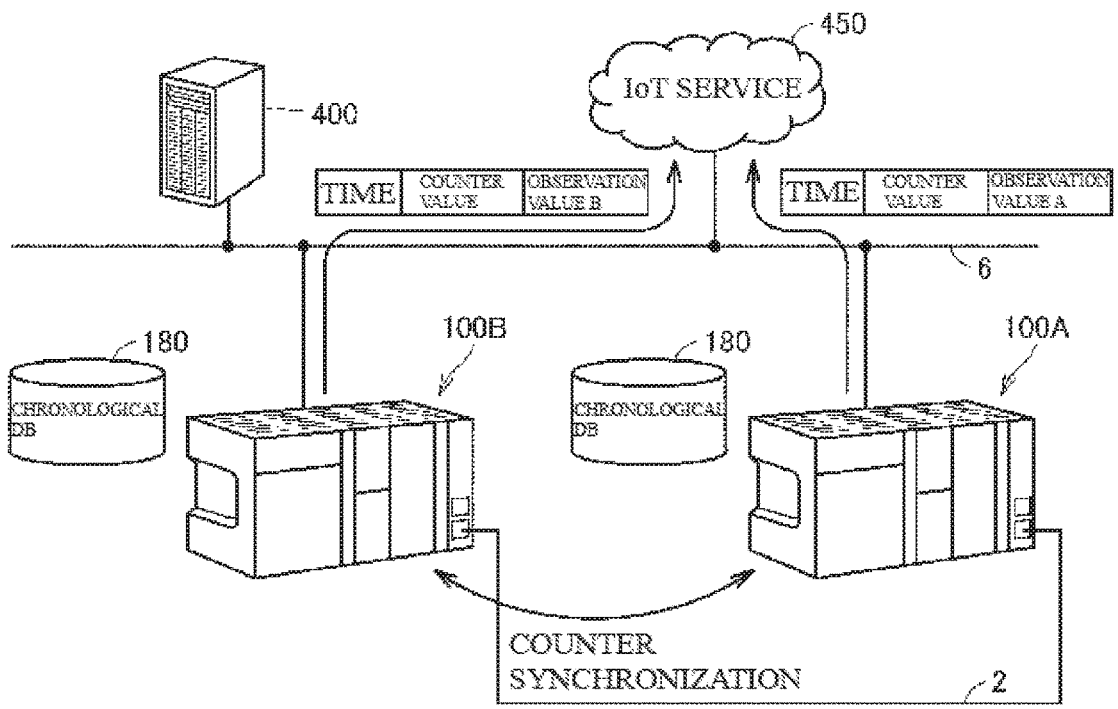

FIGS. 11A and 11B are schematic diagrams showing examples of processing that is performed when control apparatuses according to one or more embodiments transmit chronological data to an external system. FIG. 11A shows a configuration in which the control apparatuses 100A and 100B are connected to the manufacturing execution system 400 and the IoT service 450 via the host network 6. In the configuration shown in FIG. 11A, a field bus is not provided between the control apparatus 100A and the control apparatus 100B. In such a configuration, the control apparatuses 100A and 100B transmit pieces of chronological data to the IoT service 450.

The pieces of chronological data include observation values collected by the control apparatuses 100A and 100B and times that are associated with the observation values. In other words, with the configuration shown in FIG. 11A, the control apparatuses 100A and 100B can only add times as information that indicate when the observation values were collected. The times are separately managed by the control apparatuses 100A and 100B, and time synchronization is not perfectly performed.

As a result, the times included in the pieces of chronological data collected by the IoT service 450 do not perfectly match with each other. Therefore, it is impossible to aggregate (i.e. integrate) the pieces of chronological data by accurately adjusting timing.

In contrast, with the configuration shown in FIG. 11B, the field bus 2 that connects the control apparatus 100A and the control apparatus 100B is provided. Therefore, counter synchronization can be performed via the field bus 2. As a result, the pieces of chronological data transmitted from the control apparatuses 100A and 100B can be configured to include, in association with the collected observation values, times and counter values that indicate when the observation values were collected.

The IoT service 450 can use the counter values included in the pieces of chronological data received from the control apparatuses 100A and 100B to adjust timing with respect to the observation values included in the pieces of chronological data. That is, even if observation values are individually collected by different control apparatuses, aggregation and analysis can be performed in conformity with a substantially same time axis.

f4: Association with Event Data

Next, the following describes an example of processing that is performed to associate chronological data collected by the control apparatus 100 and event data with each other.

Figure 12:
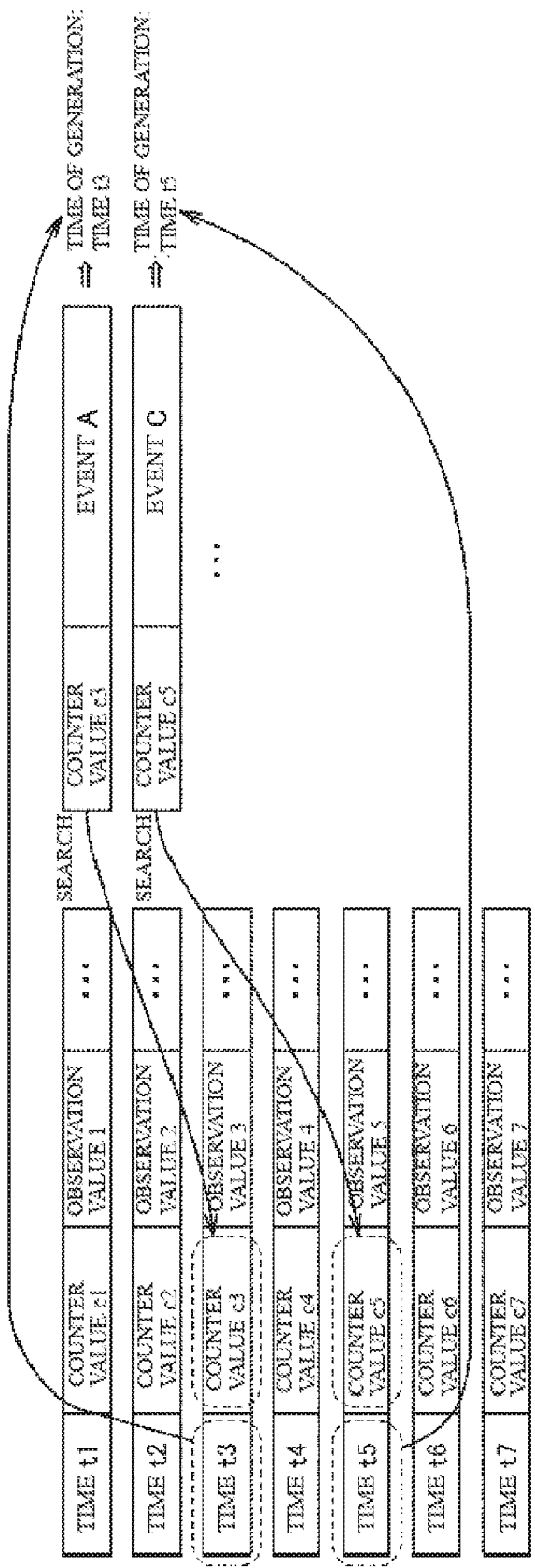
FIG. 12 is a diagram illustrating processing that is performed on chronological data and event data that are stored in a chronological database of a control apparatus according to one or more embodiments.

FIG. 12 is a diagram illustrating processing that is performed on chronological data and event data that are stored in the chronological database 180 of the control apparatus 100 according to one or more embodiments. As shown in FIG. 12, for example, chronological data including an observation value is stored in the chronological database 180 of the control apparatus 100 at predetermined intervals, and event data is also generated and stored therein when a predetermined condition is satisfied. At least a counter value is added to these pieces of data.

In this way, a record generator of the control apparatus 100 may generate an event that corresponds to a predetermined condition when the predetermined condition is satisfied, and further generate a record in which a counter value indicated by a counter that indicates timing with which the event is generated is associated with the content of the generated event.

For example, each record of event data stores a counter value and the content of an occurred event in association with each other. Looking at a record composed of "counter value c3" and "event A", which is included in the event data when the chronological data is referred to, not only "observation value 3" taken when "event A" occurred, but also "time t3" when "event A" occurred can be specified, using "counter value c3" as a common search key.

Similarly, looking at a record composed of "counter value c5" and "event B", which is included in the event data, when the chronological data is referred to, not only "observation value 5" taken when "event B" occurred, but also "time t5" when "event B" occurred can be specified, using "counter value c5" as a common search key.

In this way, observation values collected at different points in time, and times and counter values that specify the points in time, are stored in association with each other in chronological order, and if an event occurred, a counter value that indicates when the event occurred is also acquired. Consequently, it is possible to perform ex-post analysis not only on observation values corresponding to the event, but also times.

By associating chronological data and event data using a counter value, it is possible to realize more precise failure analysis and abnormality analysis, for example.

G. Time Compensation/Data Loss Detection

Next, the following describes an application example in which time compensation and data loss detection are performed based on information included in chronological data.

g1: Time Compensation

The following describes an example of processing when time compensation is performed based on a relationship between a time and a counter value or an index value.

Figures 13, 14:
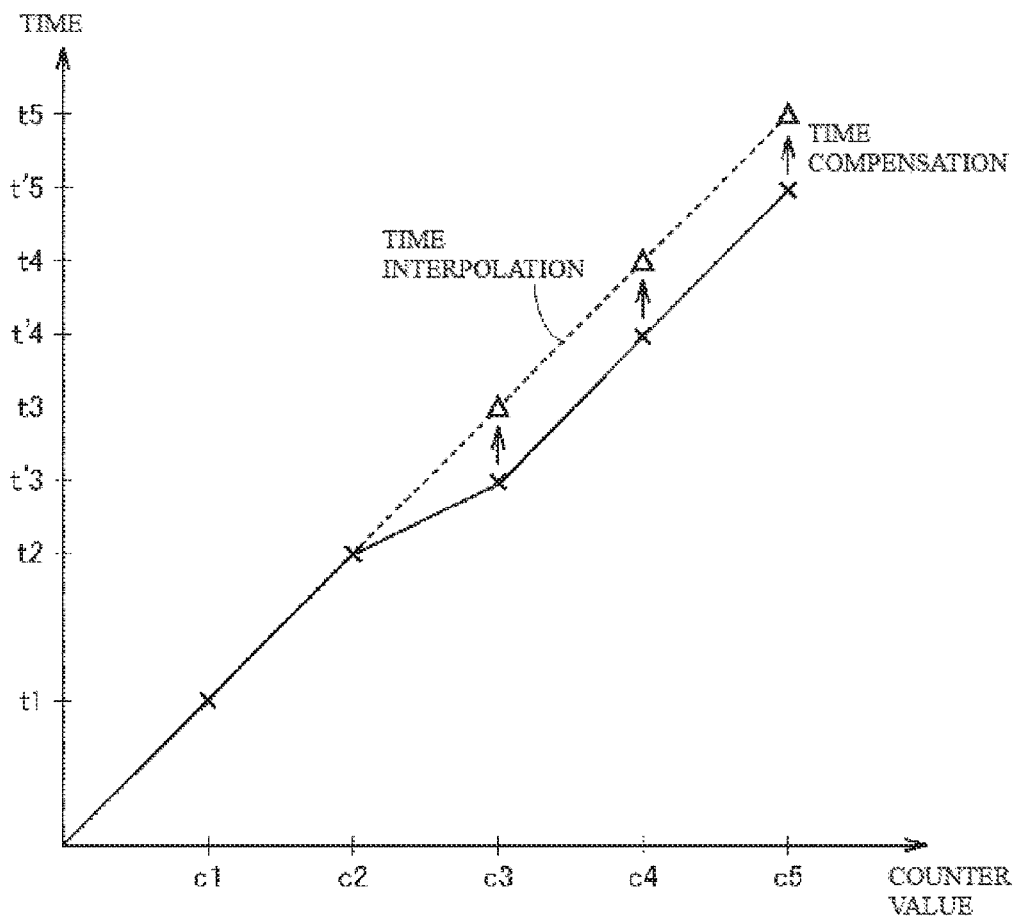
FIG. 13 is a schematic diagram illustrating an example of chronological data that is stored in a chronological database of a control apparatus according to one or more embodiments.
FIG. 14 is a diagram illustrating processing for time compensation that is based on chronological data, such as in FIG. 13.

FIG. 13 is a schematic diagram showing an example of chronological data that is stored in the chronological database 180 of the control apparatus 100 according to one or more embodiments. FIG. 14 is a diagram illustrating processing for time compensation that is based on the chronological data shown in FIG. 13.

As shown in FIG. 13, each piece of chronological data includes one or more observation values that are collected at each timing, and a time, a counter value, and an index value that specifies the timing. If it can be confirmed that none of these pieces of chronological data are missing, based on the interval between the counter values (the amount of change between pieces of chronological data that are adjacent to each other in terms of time) and/or the interval between the index values (the amount of change between pieces of chronological data that are adjacent to each other in terms of time), and if time consistency is not provided, time compensation may be performed to achieve time consistency.

In the example shown in FIG. 13, the time of the third piece of chronological data, which should be t3, has changed to t'3 (=t3+time correction amount Δt) according to a time synchronization protocol or the like of the control apparatus 100. If such time correction has been performed, it may be preferable that time compensation is performed to achieve consistency between pieces of chronological data generated before and after when the time correction was performed. In such a case, time compensation can be performed using the counter values or the index values to interpolate the time.

For example, as shown in FIG. 14, when the horizontal axis indicates the counter value and the vertical axis indicates the time, the counter value and the time should originally be in a proportional relationship. However, a time correction causes an offset in this proportional relationship. Therefore, the processor of the support apparatus 200 and the processor of the system that constitutes the IoT service 450, which have read out the chronological data from the chronological database 180, can perform time compensation by calculating a shift from the time that is to be interpolated as an offset (time correction amount Δt) with reference to the counter values of the chronological data.

As described above, even if time correction is performed in any of the control apparatuses that synchronize with each other in terms of the counter values, it is possible to maintain consistency between pieces of chronological data due to time compensation being performed in response to the time correction.

g2: Data Loss Detection

The following describes an example of processing that is performed to detect data loss by adding an index value during a data writing process.

Figure 15:
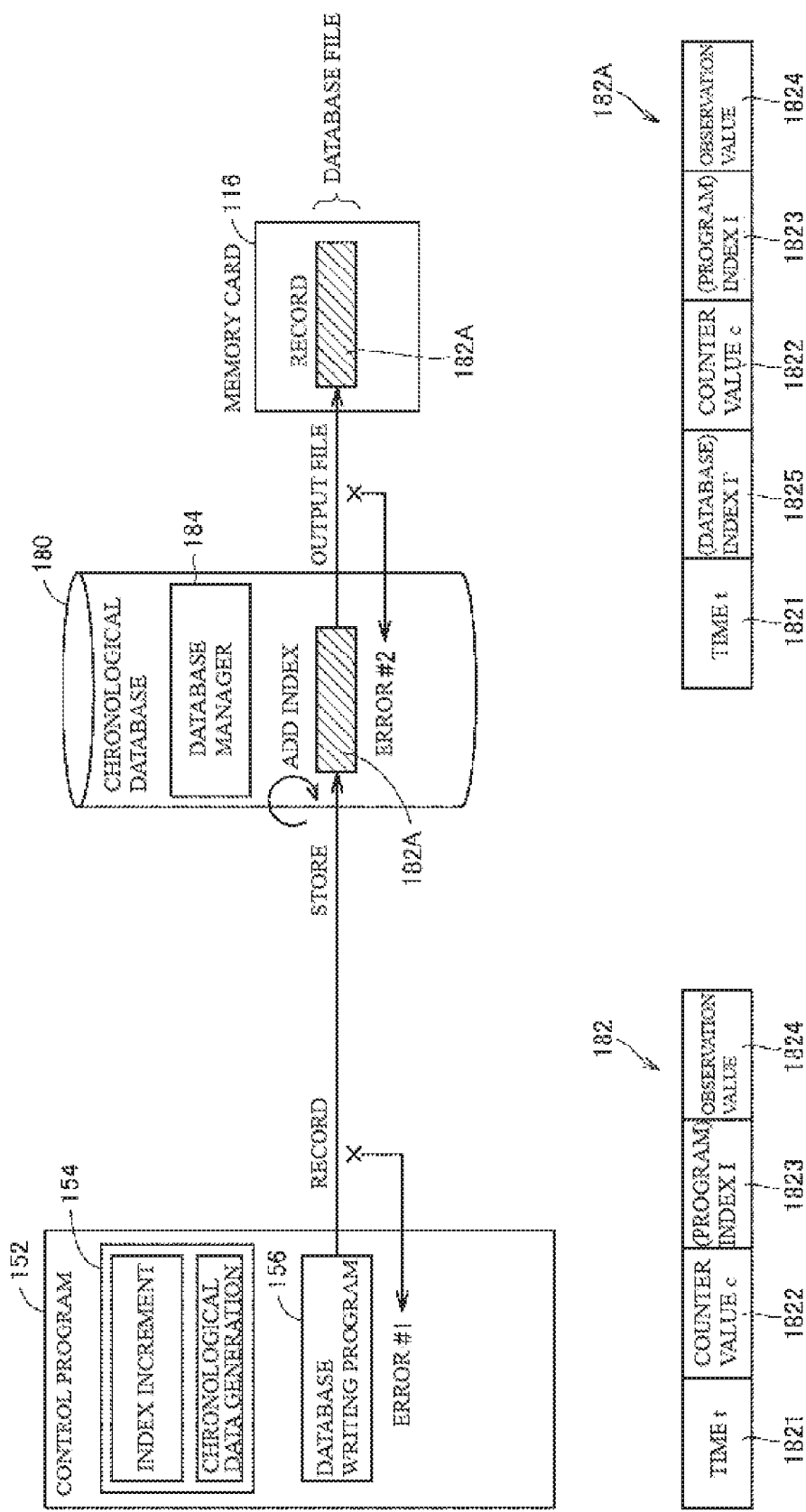
FIG. 15 is a schematic diagram illustrating an example of processing that is performed on chronological data in a control apparatus according to one or more embodiments.

FIG. 15 is a schematic diagram showing an example of processing that is performed on chronological data in the control apparatus 100 according to one or more embodiments. The example in FIG. 15 shows an example of the process of wiring chronological data from the control programs 152 (the database writing program 156) to the chronological database 180.

More specifically, the control programs 152 that is executed by the PLC engine 150 in the control apparatus 100 includes the user program 154 and the database writing program 156.

The user program 154 includes an instruction to increment an index value at each instance of execution, and an instruction to generate chronological data at each instance of execution. The database writing program 156 is executed each time the user program 154 is executed, and the chronological data 182 thus generated is transmitted to the chronological database 180.

Each record in the chronological data 182 includes the time field 1821, the counter value field 1822, the index field 1823, and the observation value field 1824. The index field 1823 stores a (program) index value that is incremented each time the user program 154 is executed. This (program) index value corresponds to the index value that is updated each time a record is generated, and is added to the generated record.

A database manager 184 of the chronological database 180 sequentially stores records from the database writing program 156 as database files. When storing the chronological data as database files, the database manager 184 of the chronological database 180 further adds a (database) index value, which is incremented each time a record is stored in the chronological database 180, to the record to be stored. The (database) index value corresponds to the index value that is updated each time a record is stored in the chronological database 180, and records are stored in chronological order after index values have been added thereto.

Specifically, the chronological data 182 is stored in the chronological database 180 after being converted to records of the chronological data 182A shown in FIG. 15. Each record of the chronological data 182A includes a (database) index field 1825 in addition to the time field 1821, the counter value field 1822, the (program) index field 1823, and the observation value field 1824. The index field 1825 stores an index value that is incremented each time the chronological database 180 stores chronological data.

Furthermore, a database file that includes a piece of chronological data that has been specified is output from the chronological database 180 to an external medium such as the memory card 116. The data that is output to the memory card 116 as a file includes the chronological data 182A.

During such a series of processing, there are the possibilities of (1) data loss (error #1) occurring in the process of writing chronological data from the control programs 152 (the database writing program 156) to the chronological database 180, and (2) data loss (error #2) occurring in the process of outputting a database file from the chronological database 180 to the memory card 116.

It is possible to detect such data loss and specify the process in which the data loss occurred, based on the index value added to the chronological data.

FIGS. 16A and 16B are schematic diagrams illustrating examples of processing that is performed to detect data loss occurring in the example of processing that is performed on the chronological data shown in FIG. 15. FIG. 16A shows an example of a record in a case where data loss (error #1) has occurred in the process of writing chronological data from the control programs 152 (the database writing program 156) to the chronological database 180, and FIG. 16B shows an example of a record in a case where data loss (error #2) has occurred in the process of outputting a database file from the chronological database 180 to the memory card 116.

A comparison between the records in the chronological data 182A in FIG. 16A shows that a (program index) value I3 that should originally be present between a (program) index value I2 and a (program) index value I4 is not present.

That is, since the (program) index value I3 is missing, it can be determined that data loss (error #1) occurred before the chronological data 182A was generated, i.e., in the process of writing chronological data from the control programs 152 (the database writing program 156) to the chronological database 180.

On the other hand, a comparison between the records in the chronological data 182A in FIG. 16B shows that a (database index) value I'3 that should originally be present between a (database) index value I'2 and a (database) index value I'4 is not present.

That is, since the (database) index value I'3 is missing, it can be determined that data loss (error #2) has occurred after the chronological data 182A was generated, i.e., in the process of outputting a database file from the chronological database 180 to the memory card 116.

As described above, since an index value that is incremented each time processing such as the generation or writing of chronological data is performed is included in each record, it can be determined whether or not an abnormality such as data loss has occurred in any of the series of processing such as the generation, storage, and output of chronological data. Furthermore, by determining which index values are discontinuous, it is possible to specify a process in which data loss has occurred.

H. Processing Procedures

Next, the following describes processing procedures performed by the control system 1 that includes the control apparatus 100 according to one or more embodiments.

h1: Generation and Storage of Chronological Data

First, the following describes processing related to generation and storage of chronological data in the control apparatus 100 according to one or more embodiments.

Figure 17:
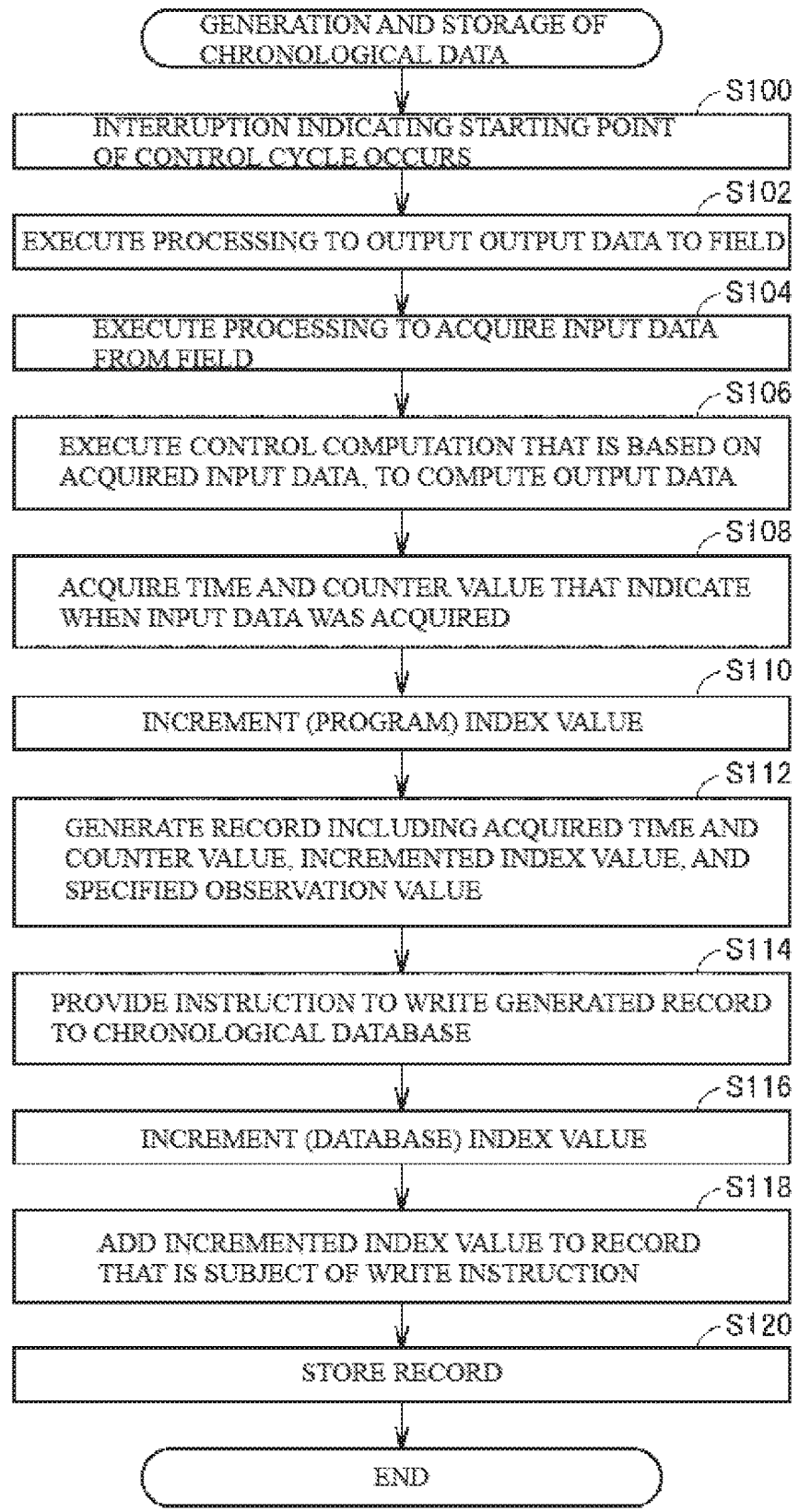
FIG. 17 is a flowchart illustrating processing procedures related to generation and storage of chronological data in a control apparatus according to one or more embodiments.

FIG. 17 is a flowchart showing processing procedures related to generation and storage of chronological data in the control apparatus 100 according to one or more embodiments. Each of the steps shown in FIG. 17 is typically realized by the processor 102 of the control apparatus 100 reading out the control programs 152 (the user program 154, the database writing program 156, the serializing communication program 158, and so on) stored in the secondary storage apparatus 108, loading the programs to the primary storage apparatus 106, and executing the programs.

As shown in FIG. 17, upon an interruption that indicates the starting point of a control cycle occurring (step S100), the processor 102 executes processing to output, to a field, output data that has been computed through control computation in the previous control cycle (step S102), and then executes processing to acquire input data from the field (step S104).

Then, the processor 102 executes control computation that is based on the acquired input data according to an instruction described in the user program 154, to compute output data (step S106).

Subsequently, the processor 102 acquires a time and a counter value that indicate when the input data was acquired (step S108), and increments the (program) index value (step S110). Then, the processor 102 generates a record that includes the acquired time and counter value, the incremented index value, and specified observation values (input data, output data, computation data, manufacturing data, event data, and so on) (step S112). Furthermore, the processor 102 provides an instruction to write the generated record to the chronological database 180 (execution of the database writing program 156) (step S114).

The chronological database 180 increments the (database) index value (step S116), adds the incremented index value to the record that is the subject of the write instruction (step S118), and then stores the record (step S120).

Thus, processing in one control cycle is complete. Note that the processing performed in steps S116 to S120 to store a record in the chronological database 180 is not necessarily complete in one control cycle, and may be executed over a plurality of control cycles.

h2: Aggregation of Chronological Data

Next, the following describes processing related to aggregation of a plurality of pieces of chronological data in the control apparatus 100 according to one or more embodiments or a host device.

Figure 18:
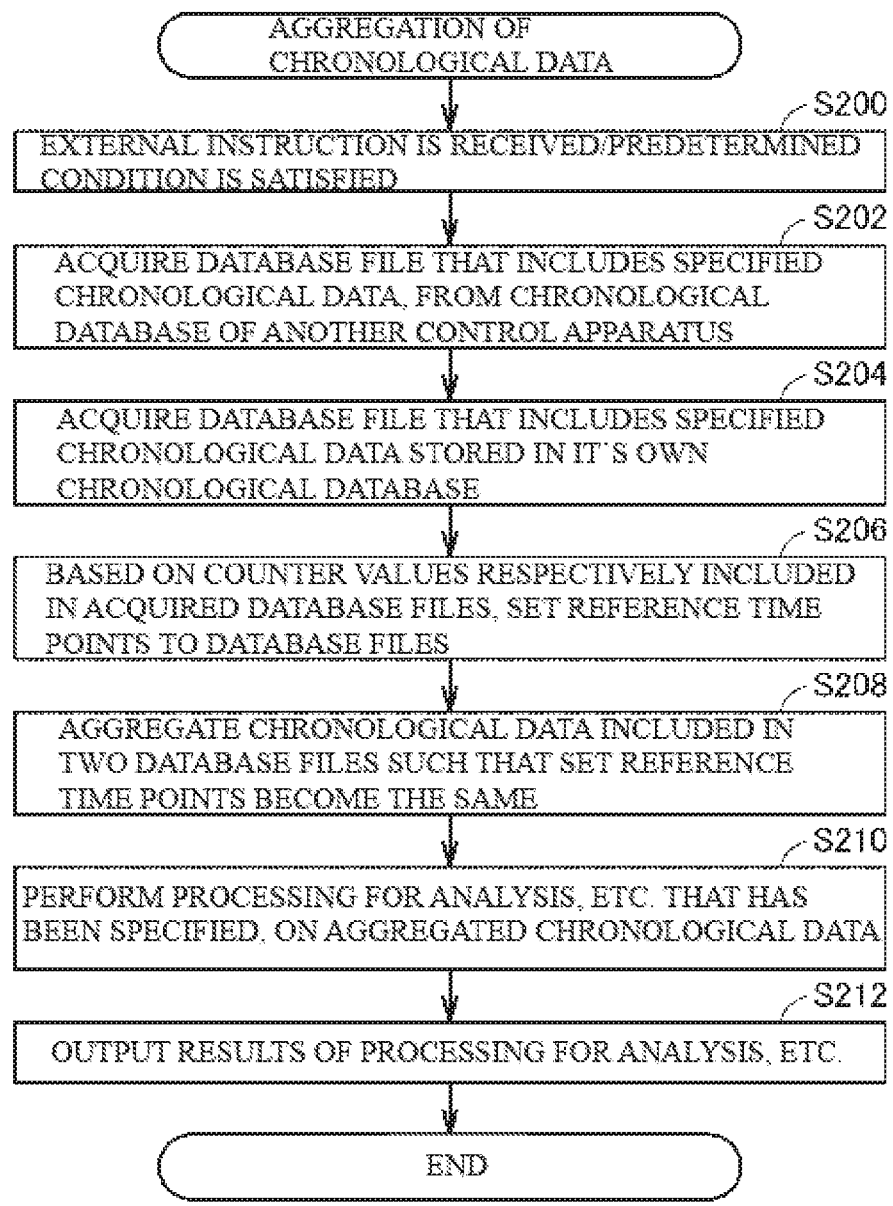
FIG. 18 is a flowchart illustrating processing procedures related to aggregation of chronological data in a control apparatus according to one or more embodiments.

FIG. 18 is a flowchart showing processing procedures related to aggregation of chronological data in the control apparatus 100 according to one or more embodiments. Each of the steps shown in FIG. 18 is typically realized by the processor 102 of the control apparatus 100 executing various kinds of tool programs.

As shown in FIG. 18, upon the processor 102 receiving an external instruction, or upon a predetermined condition being satisfied (step S200), the processor 102 acquires a database file that includes the specified chronological data, from the chronological database 180 of another control apparatus 100 (step S202). Subsequently, the processor 102 acquires a database file that includes the specified chronological data stored in its own chronological database 180 (step S204).

Then, based on the counter values respectively included in the acquired database files, the processor 102 sets reference time points to the database files (step S206), and aggregates chronological data included in the two database files such that the reference time points become the same (step S208). In this way, data aggregation processing is performed based on counter values included in records stored in chronological order, after timing with other records stored in chronological order is adjusted.

Then, the processor 102 performs processing for analysis or the like that has been specified, on the aggregated chronological data (step S210), and outputs the results (step S212).

Thus, one cycle of analysis processing or the like is complete.

I. Advantages

With a conventional configuration, time that indicates when data was recorded, or an index that indicates the order in which the data was recorded is typically added to the data.

However, in a large-scale control system or a networked control system, the time may fluctuate. Therefore, there is a difference (e.g. no greater than the order of seconds) between the times associated with pieces of data respectively recorded by different devices or the like, and the state where the pieces of data were generated cannot be accurately reproduced. Also, using an index that indicates the order in which pieces of data were recorded does not suffice to realize precise matching (e.g. of the order of microseconds) between pieces of data that were respectively recorded by a plurality of systems.

In contrast with such a conventional configuration, a control apparatus according to one or more embodiments adds, to data (observation values) that is collected and stored, a counter value indicated by a counter (a counter that controls the execution timing of control computation performed by the control device and/or a counter that controls communication timing between the control apparatus and other devices) in addition to the time that indicates when the data was acquired, and thus realizes more precise data matching. Employing such a data structure makes it unnecessary to perform complex ex-post time correction or the like. Therefore, it is possible to reduce the load on processors and improve the overall processing speed.

Furthermore, adding an index value that is updated each time data is generated or stored, in addition to the time and the counter value, makes it easier to detect the order in which pieces of data are arranged, a time difference between adjacent pieces of data, a data loss in a data sequence, and so on. Employing such a data structure makes it unnecessary to use a data loss recovery algorithm. Therefore, it is possible to reduce the load on processors.

By adding the time and a counter value to records that are stored as chronological data, it is possible to accurately reproduce and analyze a control target's behavior or the like performed when a certain event occurred, with reference to the stored chronological data.

Furthermore, it is possible to compare and analyze waveforms or the like regarding an event that occurred at a given point in time, between a plurality of pieces of chronological data respectively collected and stored in a plurality of systems.

One or more embodiments disclosed in this application is to be considered in all respects as illustrative and not limiting. The scope of the present invention should be construed in view of the appended claims, rather than the foregoing description, and all changes that come within the meaning and range of equivalency of the claims are intended to be embraced therein.

The invention claimed is:

1. A control apparatus for controlling a control target, comprising a processor configured with a program to perform operations comprising:
operation as a time manager configured to manage time;
operation as counters configured to synchronize with at least one device including an I/O unit, the counters comprising:
a first counter providing execution timing of the processor; and
a second counter managing data communication timing on a bus or a network for periodical communication to establish a connection with another control apparatus;
operation as a control computation unit configured to execute control computation according to timing indicated by the first counter;
operation as a controller configured to transmit and receive data to and from the at least one device on the bus or the network;
operation as a record generator configured to generate a record that includes an observation value that is available to the control computation unit and is related to the control target, a time that is indicated by the time manager and is associated with the observation value, and a counter value that is indicated by any of the first counter and the second counter and is associated with the observation value; and
operation as a synchronization manager configured to provide the at least one device with an instruction to match a counter value indicated by a counter of the at least one device with a counter value indicated by the second counter, wherein
the processor is configured with the program such that the second counter and the synchronization manager are implemented in the controller.

2. The control apparatus according to claim 1,
wherein the processor is configured with the program such that operation as the record generator comprises adding a first index value that is updated each time a record is generated, to the record.

3. The control apparatus according to claim 2, wherein the processor is configured with the program to perform operations further comprising:
operation as a chronological database configured to store records generated by the record generator, in chronological order.

4. The control apparatus according to claim 1, wherein the processor is configured with the program to perform operations further comprising:
operation as a chronological database configured to store records generated by the record generator, in chronological order.

5. The control apparatus according to claim 4,
wherein the processor is configured with the program such that operation as the chronological database comprises storing a record in chronological order after further adding, to the record, a second index value that is updated each time the record is stored.

6. The control apparatus according to claim 1,
wherein the observation value includes at least one of: input data that is acquired from the control target; output data that is determined through control computation that is based on the acquired input data and is output to the control target; and computation data that is computed during the control computation.

7. The control apparatus according to claim 1,
wherein the processor is configured with the program such that operation as the record generator comprises generating an event that corresponds to a predetermined condition when the predetermined condition is satisfied, and further generate a record in which a counter value indicated by the counter that indicates timing with which the event is generated is associated with the content of the generated event.

8. The control apparatus according to claim 1,
wherein the record includes the time and the counter value associated with the observation value as keys, and the observation value as a value corresponding to the keys.

9. An information processing method for a control system that includes a control apparatus that controls a control target, the control apparatus comprising: a first counter providing execution timing of a processor; and a second counter managing data communication timing on a bus or a network for periodical communication to establish a connection with another control apparatus, wherein the second counter is implemented in a controller of the control apparatus and transmits and receives data to and from at least one device including an I/O unit on the bus or the network, the method comprising:
managing time;
executing control computation according to timing that is indicated by a counter configured to synchronize with at the least one device;
generating a record that includes an observation value related to the control target, a time that is associated with the observation value, and a counter value that is indicated by any of the first counter and the second counter and is associated with the observation value, and stores the record in chronological order;
aggregating data based on a counter value included in a record stored in chronological order, after adjusting timing with another record stored in chronological order; and
providing, by a synchronization manager implemented in the controller the at least one device with an instruction to match a counter value indicated by a counter of the at least one device with a counter value indicated by the second counter.

* * * * *